US012207771B2

(12) United States Patent
Crismann et al.

(10) Patent No.: US 12,207,771 B2
(45) Date of Patent: Jan. 28, 2025

(54) ADAPTOR ASSEMBLY FOR A FLUID DISPENSING SYSTEM

(71) Applicant: Essity Hygiene and Health Aktiebolag, Gothenburg (SE)

(72) Inventors: Sebastiano Crismann, Johannesburg (ZA); Sofia Hodossy, Gothenburg (SE); Karl Walheim, Borlänge (SE); Joel Olsson, Borlänge (SE)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 49 days.

(21) Appl. No.: 17/926,493

(22) PCT Filed: May 20, 2020

(86) PCT No.: PCT/EP2020/064199
§ 371 (c)(1),
(2) Date: Nov. 18, 2022

(87) PCT Pub. No.: WO2021/233547
PCT Pub. Date: Nov. 25, 2021

(65) Prior Publication Data

US 2023/0180971 A1 Jun. 15, 2023

(51) Int. Cl.
*A47K 5/12* (2006.01)
*B05B 11/10* (2023.01)

(52) U.S. Cl.
CPC .............. *A47K 5/12* (2013.01); *A47K 5/1209* (2013.01); *B05B 11/103* (2023.01); (Continued)

(58) Field of Classification Search
CPC ...... A47K 5/12; A47K 5/1209; A47K 5/1207; A47K 5/1208; A47K 2201/02; B05B 11/103; B05B 11/1014; B05B 11/1057
See application file for complete search history.

(56) References Cited

U.S. PATENT DOCUMENTS 4,349,133 A * 9/1982 Christine ............. A47K 5/1215 222/207
4,667,854 A * 5/1987 McDermott ......... A47K 5/1215 222/181.2

(Continued)

FOREIGN PATENT DOCUMENTS

CN 101327868 A 12/2008
CN 103736165 A 4/2014

(Continued)

OTHER PUBLICATIONS

Columbian Office Action w English Translation; CO Application No. NC2022/0016318; Date Mailed: Feb. 15, 2024; pp. 1-19.

(Continued)

*Primary Examiner* — Bob Zadeh
(74) *Attorney, Agent, or Firm* — CANTOR COLBURN LLP

(57) ABSTRACT

An adaptor assembly for use in a dispenser for a replaceable fluid container comprising a fluid reservoir and a fluid pump. The adapter assembly is used in conjunction with the dispenser to allow a use of a fluid container having a pump being actuated by laterally compressing it. The adaptor assembly comprises an actuation part being movable, when mounted in the dispenser, and comprises a first contact surface for abutting against the user actuator and a second contact surface for abutting against the pump. The adaptor assembly also comprises a first connecting support for removably connecting the actuation part to the dispenser and/or the fluid dispensing package mounted in the compartment. A fluid dispensing system including the adaptor assembly is also disclosed.

27 Claims, 19 Drawing Sheets

(52) U.S. Cl.
CPC .......... *A47K 5/1207* (2013.01); *A47K 5/1208* (2013.01); *A47K 2201/02* (2013.01)

(56) References Cited

U.S. PATENT DOCUMENTS

| | | | | | |
|---|---|---|---|---|---|
| 4,778,085 | A * | 10/1988 | Bush | A47K 5/1215 222/207 |
| 5,265,772 | A * | 11/1993 | Bartasevich | B65D 77/067 222/153.01 |
| 5,810,204 | A * | 9/1998 | Devlin | A47K 5/1209 222/88 |
| 6,189,740 | B1 * | 2/2001 | Wade | A47K 5/1215 222/207 |
| 6,929,155 | B1 * | 8/2005 | Sayers | A47K 5/1208 222/207 |
| 8,342,368 | B2 * | 1/2013 | Ophardt | G01F 11/125 222/137 |
| 9,326,645 | B1 | 5/2016 | Bank et al. | |
| 2006/0113324 | A1 | 6/2006 | Rudesill et al. | |
| 2010/0018999 | A1 | 1/2010 | Maas et al. | |
| 2010/0219206 | A1 | 9/2010 | Ophardt | |
| 2010/0303983 | A1 | 12/2010 | Rodriguez et al. | |
| 2013/0105519 | A1 * | 5/2013 | Sundberg | A47K 5/1207 222/190 |
| 2013/0299518 | A1 * | 11/2013 | McNulty | A47K 5/14 222/207 |
| 2014/0027473 | A1 * | 1/2014 | Jokitalo | B65D 35/40 222/207 |
| 2015/0216370 | A1 | 8/2015 | Lightner et al. | |
| 2015/0355707 | A1 | 12/2015 | Schindler et al. | |
| 2017/0188759 | A1 | 7/2017 | Borke | |
| 2020/0000292 | A1 | 1/2020 | Krishnan et al. | |
| 2020/0113392 | A1 | 4/2020 | Ophardt et al. | |

FOREIGN PATENT DOCUMENTS

| | | | | |
|---|---|---|---|---|
| CO | 03078989 | | 9/2003 | |
| CO | 09077718 | | 7/2009 | |
| DE | 102011054404 | A1 | 4/2013 | |
| EP | 0744147 | A1 | 11/1996 | |
| EP | 0866181 | A2 | 9/1998 | |
| EP | 2216261 | A2 | 8/2010 | |
| EP | 3248523 | A2 | 11/2017 | |
| EP | 3539432 | A1 * | 9/2019 | A47K 5/16 |
| WO | 2009104992 | A1 | 8/2009 | |
| WO | 2011133085 | A1 | 10/2011 | |
| WO | 2013056744 | A1 | 4/2013 | |
| WO | 2014063184 | A1 | 5/2014 | |
| WO | 2019063173 | A1 | 4/2019 | |

OTHER PUBLICATIONS

International Search Report & Written Opinion for International Application No. PCT/EP2020/066817; International Filing Date: Jun. 17, 2020; Date of Mailing: Mar. 2, 2021; 14 pages.
International Search Report & Written Opinion for International Application No. PCT/EP2020/064199; International Filing Date: May 20, 2020; Date of Mailing: Feb. 19, 2021; 86 pages.
Colombia Office Action issued in Colombian Application No. NC2022/0016628 dated Mar. 1, 2024 (with English Translation).
Colombian Application No. NC2022/0016318; Office Action with English dated Jul. 16, 2024; 26 pages.
Colombian Application No. NC2022/0016628; Office Action with English dated Aug. 20, 2024; 33 pages.
Chinese Application No. 202080101114.9; Office Action with English translation dated Sep. 21, 2024; 24 pages.

* cited by examiner

ADAPTOR ASSEMBLY FOR A FLUID DISPENSING SYSTEM

CROSS REFERENCE TO RELATED APPLICATIONS

This application is a National Stage application of PCT/EP2020/064199, filed May 20, 2020, which is incorporated by reference in its entirety herein.

TECHNICAL FIELD

The present disclosure generally relates to fluid dispensing systems for dispensing skincare and cleaning products such as soaps, gels, disinfectants and the like. The disclosure is specifically directed to a dispenser adaptor assembly to be used in the fluid dispensing system to allow the use of multiple types of disposable fluid dispensing packages of refill containers and fluid pumps in the dispenser.

BACKGROUND

Fluid dispensers of various types are known. In particular, for dispensing of cleaning products such as soaps, there are a wide variety of manually or automatically actuated pumps that dispense a given quantity of the product into a user's hand.

Consumer products may include a dispensing outlet as part of the package, actuated by a user pressing down the top of the package. Such packages use a dip tube extending below the level of the liquid and a piston pump that aspirates the liquid and dispenses it downwards through an outlet spout.

Commercial dispensers frequently use inverted disposable containers that can be placed in dispensing devices, affixed to walls or built into the counter of washrooms or the like. The pump may be integrated as part of the disposable container or may be part of the permanent dispensing device or both forming a fluid dispensing package. Such devices are robust and, if they are affixed to the wall, greater freedom is available in the direction and amount of force that is required for actuation.

One dispensing system that uses a pump to dispense a unit dose of liquid from an inverted collapsible container has been described in WO2009/104992. The pump is formed of just few elements with a resilient pumping chamber and regulator valves. Operation of the pump occurs by application of a lateral force to the pumping chamber, causing it to partially collapse and expel its contents through the outer valve. Refilling of the pumping chamber occurs through the inner valve once the lateral force is removed. The filling force is provided by the inherent resilience of the wall of the pumping chamber, which should be sufficient to overcome any back-pressure due to a resistance to collapse of the container.

Other dispensing systems use an axial force for actuation of the pump i.e. directed in alignment with the direction in which the fluid is dispensed.

In many cases different dispensing systems with different types of fluid dispensing packages with the different pump types may be used at given location, e.g. a building may have a mixture of dispensers for use with different dispensing packages, in turn requiring a having the different types of fluid dispensing packages in stock instead of just having one type in the stock. Consequently, it would be desirable to provide a dispensing system that could operate in different operating dispensing solutions, e.g. in axially operating dispensing solutions as well lateral operating dispensing solutions.

SUMMARY

It is desirable to have a dispensing system that is flexible in its operating manner and reliable when used so as to allow different types of fluid dispensing packages, yet simple, hygienic, environmentally acceptable and economical to produce.

The disclosure relates in particular to adaptor assemblies and fluid dispensing systems. Embodiments are set forth in the following description and in the drawings.

Thus, there is disclosed an adaptor assembly for use in a dispenser for a replaceable fluid container comprising a fluid reservoir and a fluid pump. The dispenser comprises a housing and a compartment therein for containing the fluid container, and the dispenser has a front portion, a rear portion, and upper and lower end portions, the lower end portion forming a dispensing end portion of the dispenser and comprising a user actuator, by which the dispenser is operated to dispense a dose of a fluid from the fluid container through a nozzle at the lower end portion.

The compartment of the dispenser is sized to receive a fluid container having a pump of a first type being an axially compressible pump and the actuator has an engagement portion for actuating the pump of the first type by axially compressing it in a vertical direction.

The adapter assembly is used in conjunction with the dispenser to allow a use of a fluid container having a pump of a second type within the dispenser, the second type being actuated by laterally compressing it.

The adaptor assembly comprises an actuation part being movable between a non-actuated position and a fully actuated position, when mounted in the dispenser. The actuation part comprises a first contact surface for abutting against the user actuator and a second contact surface for abutting against the pump of the second type, wherein a user force (P) applied to the user actuator displaces the actuation part from its non-actuated position towards an actuated position, thereby transferring an actuation force (TF) from the actuation part via the second surface to the pump, wherein the pump is laterally compressed to cause fluid to be dispensed from the fluid container.

The adaptor assembly also includes a first connecting support for removably connecting the actuation part to the dispenser and/or the fluid dispensing package mounted in the compartment.

As used herein, by an axial force for actuation of the pump is understood to be directed in alignment with the direction in which the fluid is dispensed. Similarly, by a lateral force is understood to be a force substantially perpendicular to the direction in which the fluid is dispensed.

As used herein, the terms "horizontal", "lateral" and "vertical", "uppermost" and "lowermost", "downwards" and "upwards", "front" and "rear", and "upper" and "lower" or the like are to be understood as seen when the dispenser is arranged for use.

The fluid container may be adapted to be filled with a liquid such as for instance liquid soap, foam soap, alcogel, disinfecting or anti-bacterial liquid, or lotion. The flexible dispensing portion may be filled with the relevant liquid and subjected to an external force in order to dispense the liquid therefrom. The pumps described herein may be of such a size that a suitable or desired volume, e.g. 1 milliliter, of the liquid may be dispensed upon performing a full dispensing stroke.

The adaptor assembly may further comprise a fixed dolly configured to abut against the pump of the second type, wherein the pump of the second type is able to be configured between the second contact surface of the actuation part and the fixed dolly and, when a user force (P) is applied to the user actuator, the pump is laterally compressed between said second surface and the fixed dolly causing fluid to be dispensed from the fluid container.

The adaptor assembly may comprise a second connecting support for removably connecting the fixed dolly to the dispenser and/or the fluid dispensing package mounted in the compartment.

The first connecting support may also configured to removably connect the fixed dolly to the dispenser and/or the fluid dispensing package mounted in the compartment.

The pump of the second type may have a resilient pumping chamber. The resilient pumping chamber may be an elongated and elastic tube chamber extending downwards at the lower portion of the fluid container in a direction from the bottom of the liquid reservoir to a nozzle of the elastic tube chamber.

The user actuator may be a user lever configured to pivot about a first pivot. Furthermore, the user lever may extend from the pivot towards a user operating portion of the user lever, wherein the user actuator has a surface that faces the compartment and is configured to abut the first contact surface of the actuation part.

The user lever may extend downwards from the first pivot.

The actuation part may comprise an elongated arm extending in a longitudinal direction (L1) thereof between two opposite ends of the arm, of which the first end is connected to the first connecting support, and the second end has an actuation head. The head is movable between the non-actuated position and the fully actuated position, wherein the actuation head comprises the second contact surface for abutting against the pump of the second type and the first contact surface for abutting against the user actuator.

The actuation head may project outwardly from the second end of the arm in at least one direction (W;X) forming an angle to the longitudinal direction (L1) of the actuation arm.

According to an embodiment. the actuation part may be movably connected to the first connecting support. The actuation part may be pivotally attached to the first connecting support and configured to pivot about a second pivot.

This allows the actuation part to move between a non-actuated position and an actuated position in lateral movement toward the dolly and the rear portion of the dispenser. The pivot may be formed by a snap connection between the first connection part and the actuation part or it can be formed by hinge connection or by a living hinge, for example.

The actuation part may comprise an elongated arm extending in a longitudinal direction (L1) thereof between two opposite ends of the arm as described above, and the first end of the elongated arm may be pivotally connected to the first connecting support and configured to pivot about the second pivot for allowing the movement of the actuation head between the non-actuated position and the fully actuated position.

According another embodiment, the elongated arm may be a flexible arm for allowing the movement of the actuation head between the non-actuated position and the fully actuated position The arm may be made of elastic material such as of polyethylene or polypropylene and is dimensioned so as to be flexible and elastic.

According yet another embodiment, the first connecting support is an elastic and flexible element with a recess having a lateral dimension being larger than the pump has in a lateral direction, and wherein the actuation part and the fixed dolly are carried by the element and form portions protruding from opposite side within the recess such that the pump of the second type is able to be configured between the second contact surface of the actuation part and the fixed dolly, wherein the elastic element is securely biased to the pump in the non-actuated position and when a user force (P) is applied to the user actuator, the element is compressed towards the dolly so that the pump is laterally compressed between said second surface and the fixed dolly causing fluid to be dispensed from the fluid container.

The elastic and flexible element may have a circular shape with a central through opening therein forming the recess.

The adaptor assembly may further comprise a fluid container support configured to be received in the compartment of the dispenser for holding the fluid container in a desired position in the compartment of the dispenser The fluid container support provides a proper holding and positioning of the fluid container in the dispenser.

The fluid container support may form the first connecting support.

The fluid container support may form the second connecting support.

The adaptor assembly may further comprise one or more positioning means for engaging corresponding one or more connectors in the dispenser and preventing axial and/or rotational movement of the adaptor assembly in the dispenser The one or more positioning means may be one or more protruding pins for engaging corresponding one or more recesses in the dispenser.

There is further provided an adaptor assembly for use in a dispenser for a replaceable fluid container. The adaptor assembly comprises an actuation part being connected to a first connecting support for removably connecting the adaptor assembly to the dispenser, wherein the actuation part comprises a first contact surface for abutting against the user actuator of a dispenser and a second contact surface for abutting against a fluid pump. The adaptor assembly further comprises a fixed dolly connected to the first connection and having a dolly surface for abutting the pump, wherein the fixed dolly and the actuation part are connected to one side of the first connecting support, wherein the dolly surface faces the actuation part.

The actuation part may comprise an elongated arm extending in a longitudinal direction (L1) thereof between two opposite ends of the arm, of which the first end is connected to the first connecting support, and the second end has an actuation head, wherein the head is movable between a non-actuated position and a fully actuated position, wherein the actuation head comprises the second contact surface for abutting against the pump and the first contact surface for abutting against the user actuator of the dispenser.

The actuation head may project outwardly from the second end of the arm in at least one direction (W;X) forming an angle to the longitudinal direction (L1) of the actuation arm.

In an embodiment, the actuation part may be movably connected to the first connecting support. The actuation part may be pivotally attached to the first connecting support and configured to pivot about a second pivot.

The actuation part may comprise the elongated arm extending in a longitudinal direction (L1) thereof between two opposite ends of the arm, wherein the first end of the elongated arm is pivotally connected to the connecting support and configured to pivot about a second pivot for allowing said movement of the actuation head between the non-actuated position and the fully actuated position.

In an embodiment, the elongated arm may be a flexible arm for allowing said movement of the actuation head between the non-actuated position and the fully actuated position In an embodiment, the first connecting support may be an elastic and flexible element with a recess on which the actuation part and the fixed dolly are carried by the element and form portions protruding from opposite side within the recess with the second contact surface of the actuation part and dolly surface facing each other. The elastic and flexible element may have a circular shape with a central through opening therein forming the recess.

The first connecting support may form a fluid container support configured to be received in the compartment of the dispenser for holding the fluid container in a desired position in the compartment of the dispenser.

The adaptor assembly may further comprise one or more positioning means for engaging corresponding one or more connectors in the dispenser and preventing axial and/or rotational movement of the adaptor assembly mounted in the dispenser. The one or more positioning means may be one or more protruding pins for engaging corresponding one or more recesses in the dispenser.

There is also provided a fluid dispensing system for dispensing fluids from a replaceable fluid container. The he dispensing system comprises a dispenser, a fluid container, and an adaptor assembly as described hereinabove. The dispenser comprises a housing and a compartment therein for containing the fluid container, and has a front portion, a rear portion, upper and lower end portions. The lower end portion forms a dispensing end portion of the dispenser and has an actuator, by which the dispensing system is operated to dispense a dose of a fluid through a nozzle at the lower end portion. The fluid container includes a fluid reservoir and a fluid pump, the fluid reservoir extending downwards from the upper portion to the fluid pump being located at the lower end portion with the nozzle arranged at the lower end of the fluid container.

The compartment of the dispenser in a dispensing system without the adaptor assembly is sized to receive a fluid container having a pump of a first type being an axially compressible pump, and the actuator has an engagement portion for actuating the pump of the first type by axially compressing it in a vertical direction towards the upper portion.

The adapter assembly adapts the compartment to be sized to receive a fluid container having a pump of a second type within the dispenser, the second type being actuated by laterally compressing it, wherein the fluid container has a pump of the second type and the actuator comprises the engagement portion for actuating the pump of the first type and a portion for moving the actuation part towards the pump of the second type.

The pump of the second type may have a resilient pumping chamber. The resilient pumping chamber may be an elongated and elastic tube chamber extending downwards at the lower portion of the fluid container in a direction from the bottom of the liquid reservoir to a nozzle of the elastic tube chamber.

The user actuator may be a user lever configured to pivot about first pivot axis and extend from the pivot axis towards a user operating portion of the user lever, and the user actuator has a surface that faces the compartment and is configured to abut the first contact surface of the actuation part.

The user lever may extend downwards from the first pivot axis.

The fluid dispensing system may further comprise a seat on which a fluid container support of the adaptor assembly rests and holds the fluid container in a desired position in the compartment of the dispenser.

The dispenser may comprise engaging means for holding the fluid container support in place in the dispenser. The engaging means may comprise an element being displaceable between a non-holding position to a holding position, The fluid dispensing system may further comprise one or more connectors for engaging the one or more positioning means of the adaptor assembly. The one or more connectors may be one or more recesses for engaging one or more pins of the adaptor assembly.

BRIEF DESCRIPTION OF THE DRAWINGS

The features and advantages of the present disclosure will be appreciated upon reference to the following drawings of a number of exemplary embodiments, in which.

DESCRIPTION OF ILLUSTRATIVE EMBODIMENTS

In the following, the fluid dispensing system and the adaptor assembly according to the disclosure will be exemplified by a few exemplary embodiments. However, this disclosure should not be construed as limited to these exemplary embodiments. Other fluid dispensing system and adaptor assembly embodiments may also be considered within the scope of the appended claims. Disclosed features of example embodiments may be combined as readily understood by one of ordinary skill in the art to which this disclosure belongs. Like numbers refer to like elements throughout. Well-known functions or constructions will not necessarily be described in detail for brevity and/or clarity.

Figure 1:
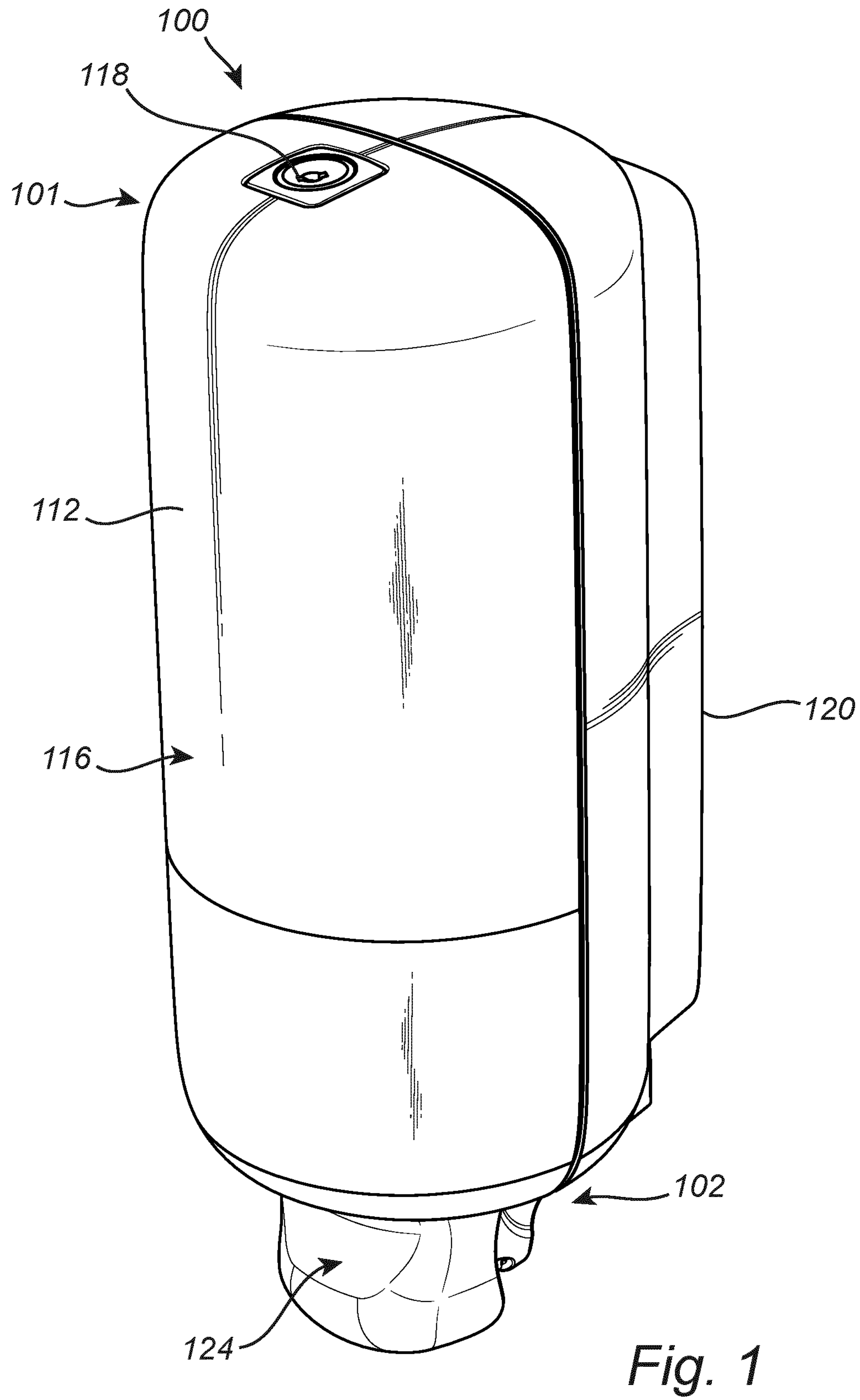
FIG. 1 shows a perspective view of a dispensing system.

FIG. 1 shows a perspective view of a fluid dispensing system 1 in which the present disclosure as claimed in the appended claims may be implemented. The dispensing system 1 includes a reusable dispenser 100 of the type used in washrooms and the like available under the name Tork™ from SCA HYGIENE PRODUCTS AB. The dispenser 100 is described in greater detail in WO2011/133085, the contents of which are incorporated herein by reference in their entirety. It will be understood that this embodiment is merely exemplary and that the present disclosure may also be implemented in other dispensing systems.

The dispenser 100 includes a rear portion 110 and a front portion 112 that engage together to form a closed housing 116 that can be secured using a lock 118 at an upper portion 101 of the dispenser 100. The housing 116 is affixed to a wall or other surface by a bracket portion 120. At a lower portion 102 of the dispenser and a lower side of the housing 116 is an actuator 124, by which the dispensing system 1 may be manually operated to dispense a dose of cleaning fluid or the like.

Figure 2:
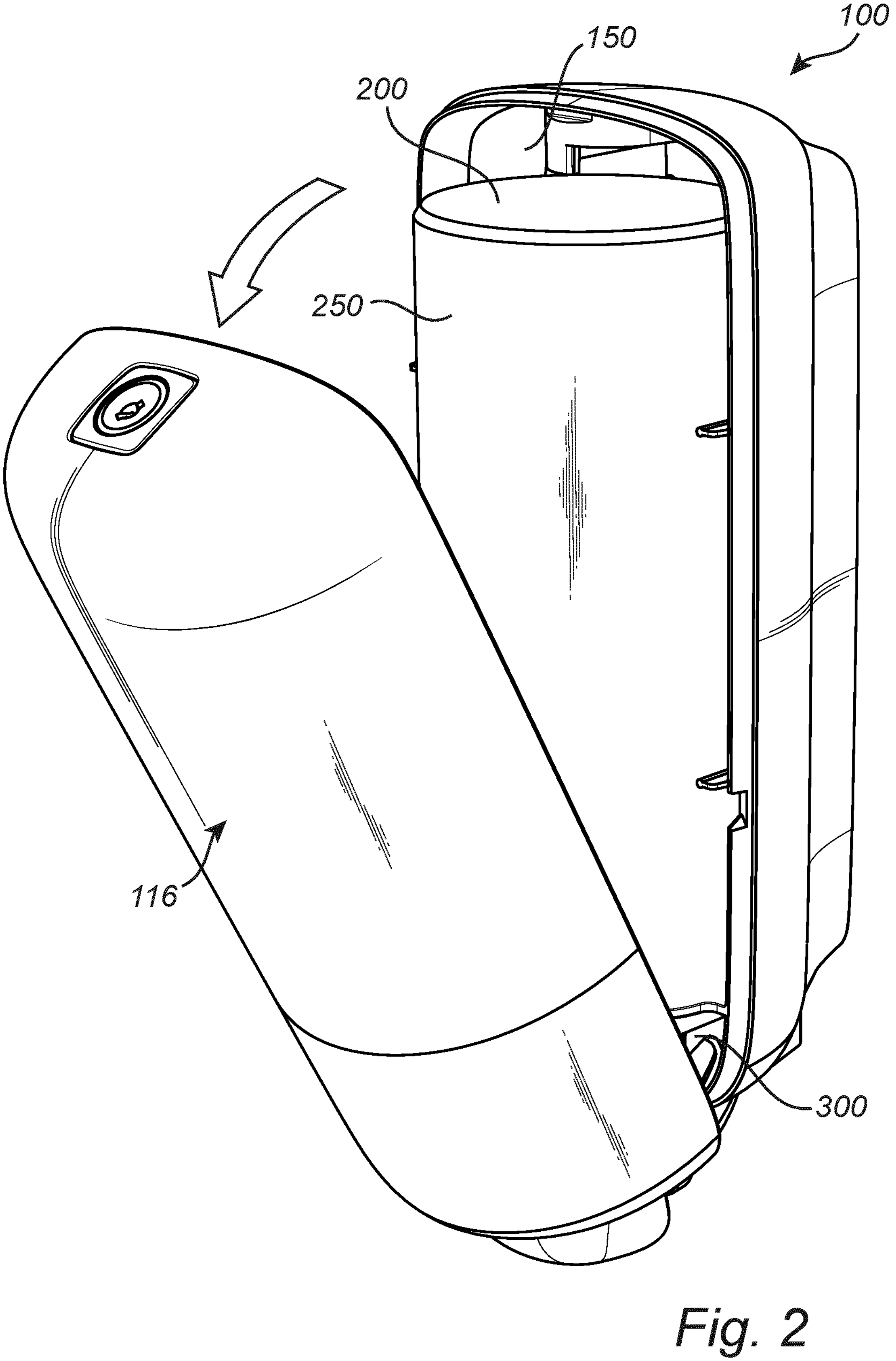
FIG. 2 shows the dispensing system of FIG. 1 in an open configuration.

FIG. 2 shows in perspective view the dispenser 100 with the housing 116 in the open configuration and with a disposable and replaceable fluid container 200 contained in a compartment 150 therein. The replaceable fluid container 200 comprises a fluid reservoir 250 and a fluid pump 300. The reservoir 250 is a 1000 ml collapsible reservoir of the type described in WO2011/133085 and also in WO2009/104992, the contents of which are also incorporated herein by reference in their entirety. The reservoir 250 is of generally cylindrical form and is made of polyethylene. The skilled person will understand that other volumes, shapes and materials are equally applicable and that the reservoir 250 may be adapted according to the shape of the dispenser 100 and according to the fluid to be dispensed. At the lower portion of the dispenser 100 is a pump 300 of the fluid container 200, which is activated by a user manually pushing a user operating portion of the actuator 124 to depress the pump and dispense the fluid from the container.

The present disclosure relates a fluid dispensing system 1 and an adaptor assembly to allow the use of different fluid containers 200 with different types of pumps 300.

A fluid container 200 with a pump 300*a* of the first type is sized to be received in the compartment 150 of the dispenser 100 without the use of an adaptor assembly. The pump of a first type is an axially compressible pump 300*a*, and the actuator 124 of the dispenser 100 has an engagement portion for actuating the pump 300*a* of the first type by axially compressing it in a vertical direction towards the upper portion 101 of the dispenser 100.

A fluid container 200 with a pump 300*b* of the second type requires the use of an adapter assembly of the disclosure. The adaptor assembly adapts the compartment 150 to be sized to receive a fluid container 200 having a pump of a second type within the dispenser 100 so as to allow the pump of a second type to be actuated by laterally compressing it to cause fluid to be dispensed from the fluid container. The actuator 124 can move an actuation part 420 of the adaptor assembly towards the pump 300*b* of the second type and laterally compress the pump.

Figure 3:
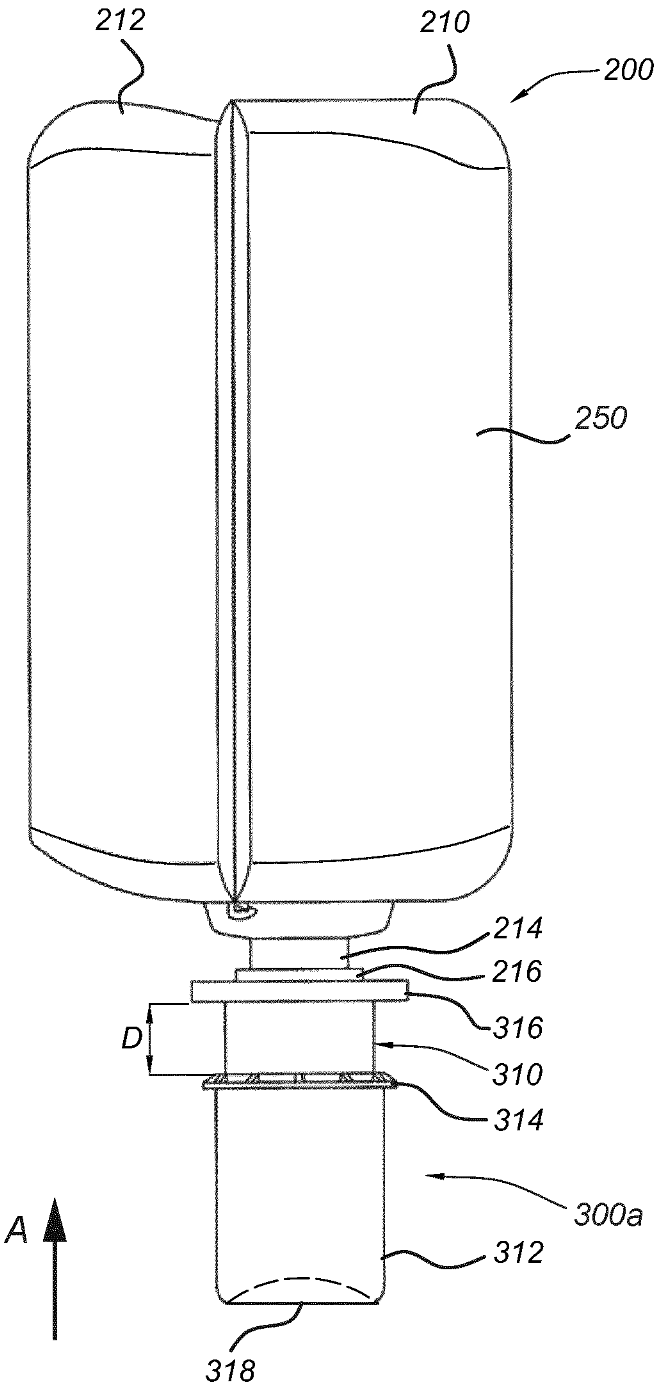
FIG. 3 shows a side view of a disposable container with a pump of a first type according to the disclosure.

FIG. 3 shows the fluid container 200 with the pump 300*a* of the first type in a side view. As can be seen, the reservoir 250 includes two portions. A hard portion 210 and a soft portion 212. Both portions 210, 212 are made of the same material but having different thicknesses. As the reservoir 250 empties, the soft portion 210 collapses into the hard portion 212 as liquid is dispensed by the pump assembly 300*a*. This construction avoids the problem with a build-up of vacuum within the reservoir 250. The skilled person will understand that although this is an example for the form of the reservoir, other types of reservoir may also be used in the context of the present disclosure, including but not limited to bags, pouches, cylinders and the like, both closed and opened to the atmosphere. The container may be filled with soap, detergent, disinfectant, skincare formulation, moisturizers or any other appropriate fluid and even medicaments. In most cases, the fluid will be aqueous, although the skilled person will understand that other substances may be used where appropriate, including oils, solvents, alcohols and the like. Furthermore, although reference will be made in the following to liquids, the dispenser 100 may also dispense fluids such as dispersions, suspensions or particulates.

At the lower side of the fluid container 200, there is provided a pump 300*a* of the first type that has an outer configuration that corresponds substantially to that described in WO2011/133085. The fluid container has a rigid neck 214 provided with a connecting flange 216. The connecting flange 216 engages with a stationary sleeve 310 of the pump assembly 300*a*. The pump assembly 300*a* also includes a sliding sleeve 312, which terminates at an orifice 318. The sliding sleeve 312 carries an actuating flange 314 and the stationary sleeve has a locating flange 316. Both the sleeves 310, 312 are injection molded of polycarbonate although the skilled person will be well aware that other relatively rigid, moldable materials may be used. In use, as will be described in further detail below, the sliding sleeve 312 is displaceable in an axial direction A by a distance D with respect to the stationary sleeve 310 in order to perform a single pumping action.

Figure 4A:
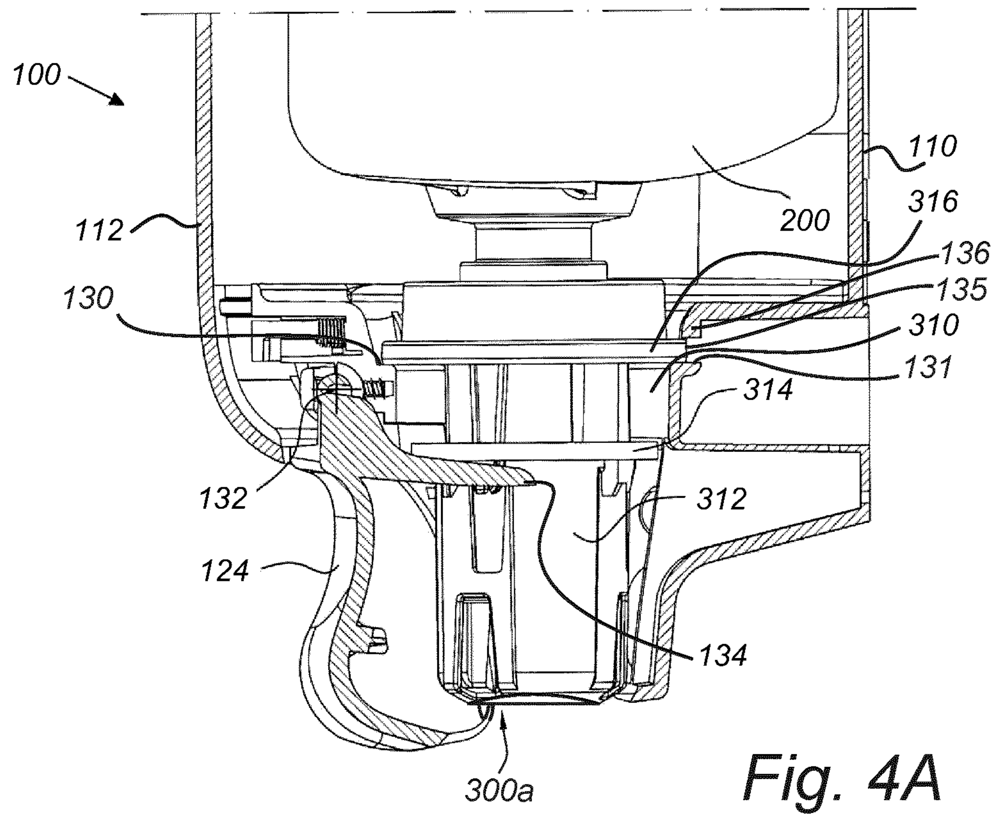
FIGS. 4A and 4B show partial cross-sectional side views of the dispensing system of FIG. 1 and the pump assembly of FIG. 3 in operation.
Figure 4B:
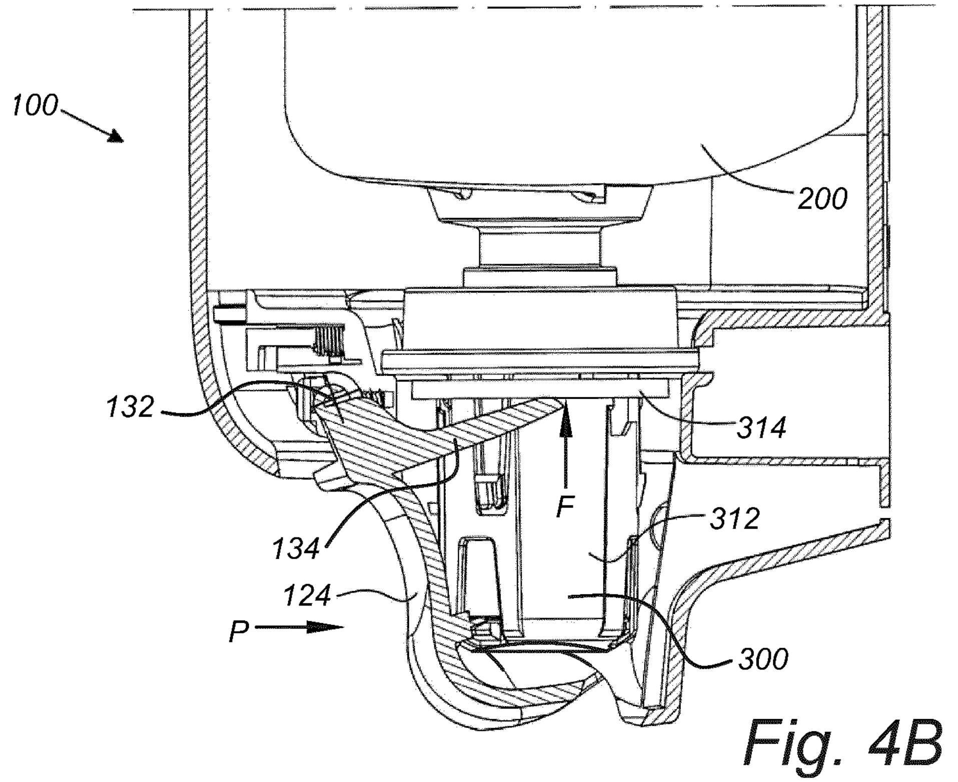

FIGS. 4A and 4B show partial cross-sectional views through the dispenser 100 of FIG. 1, illustrating the pump 300*a* of the first type in operation. According to FIG. 4A, the locating flange 316 rests on front and rear shelves 130, 131 and is engaged by a locating groove 135 formed between the rear shelf 131 and a pin 136 on the rear portion 110. The actuator 124 is pivoted at first pivot 132 to the front portion 112 and includes an engagement portion 134 that engages beneath the actuating flange 314.

FIG. 4B shows the position of the pump 300*a* of the first type once a user has exerted a force P on actuator 124. In this view, the actuator 124 has rotated anti-clockwise about the first pivot 132, causing the engagement portion 134 to act against the actuating flange 314 with a force F, causing it to move upwards. Thus far, the fluid dispensing system 1 comprising a fluid container 200 with a pump 3 of the first type and its operation may essentially be the same as that of the existing system known from WO2011/133085.

The fluid dispensing system 1 has so far been described in view of using the dispenser 100 together with the fluid container 200 with a pump 300*a* of the first type. It is desirable to be able to use the fluid container 200 with a pump 300*b* of the second type in the dispenser 100 described above without affecting the possibility of still having the possibility to load the dispenser 100 with a fluid container 200 having a pump 300*a* of the first type. A removable adaptor assembly according to the present disclosure provides this possibility. In the following, the fluid dispensing system 1 and the adaptor assembly will be exemplified in more detail by reference to enclosed drawings and a number of exemplary embodiments.

Figure 5:
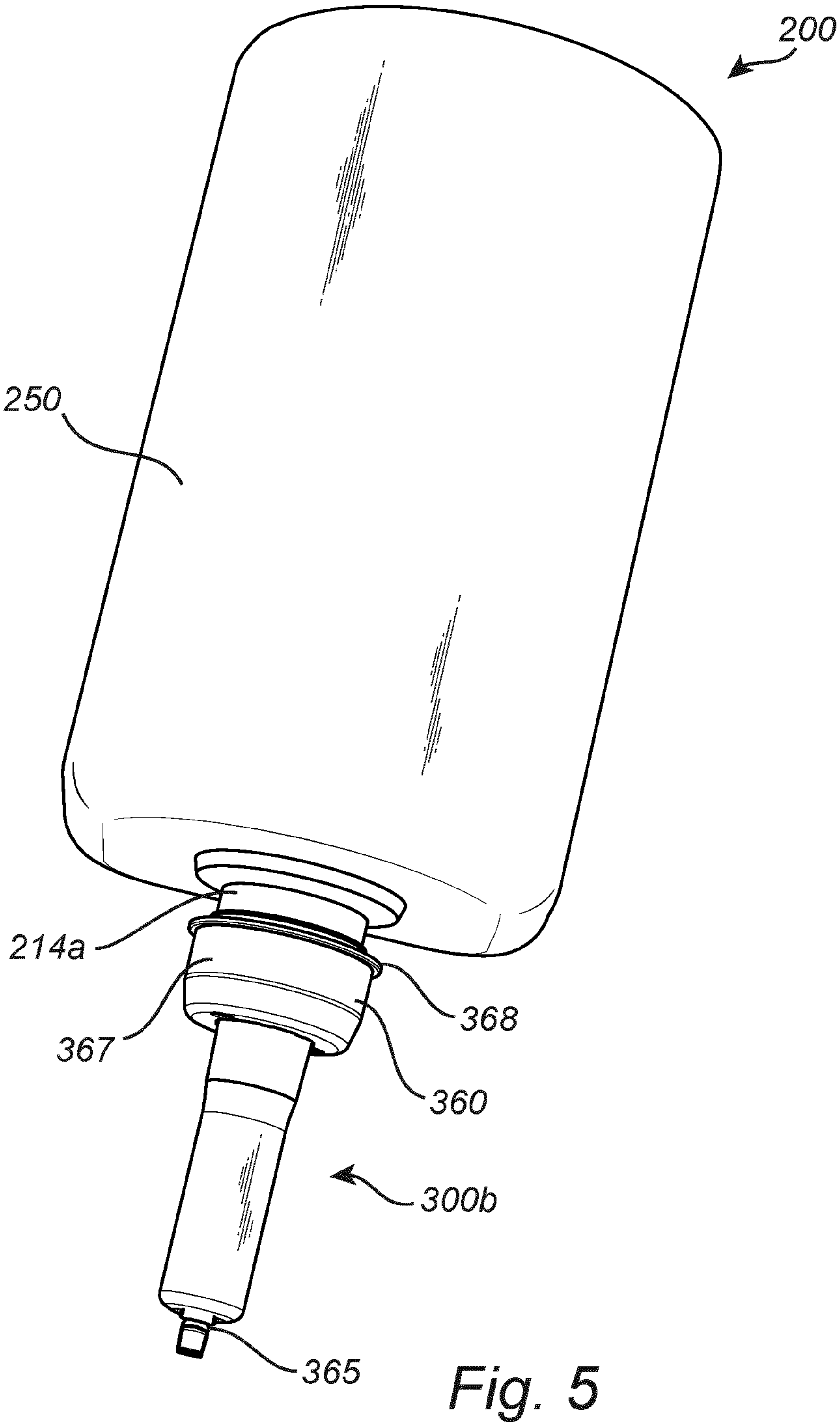
FIG. 5 shows a perspective view of a fluid container with a pump of a second type according to the disclosure.

FIG. 5 shows a perspective view of a fluid container 200 with the pump of a second type. As can be seen, the reservoir 250 is for the sake of simplicity shown to be of a generally cylindrical form. Nevertheless, the skilled person will understand that the reservoir 250 may have the same construction as described above in relation to the fluid container 200 shown in FIG. 3. The skilled person will also understand that any other types of reservoir that has been described above and that may be used with the container shown in FIG. 3 may also be used in the context of the fluid container 200 with the pump of a second type. The container may be filled fluids such as soap, detergent, disinfectant, skincare formulation, moisturizers or any other appropriate fluid as mentioned above in relation to FIG. 3.

At the lower side of the fluid container 200, there is provided the pump 300*b* of the second type that has an outer configuration of an elongated and elastic tube forming a resilient pump chamber 300*b*. The chamber is in fluid communication with an inside of the fluid reservoir and is connected to a rigid neck 214*a* of the fluid reservoir by a connector cap 360 for connecting and sealing the fluid reservoir to the chamber. A nozzle 365 is provided at the lower end of the chamber. A valve may be arranged in the chamber 300*b* close to the nozzle 365 to prevent liquid from dripping out of the liquid container, when the chamber is not squeezed. Similarly, a valve may be arranged between the chamber 300*b* and the fluid reservoir in order to prevent liquid from being pressed back into the reservoir when the chamber is being squeezed. Such valves are known in the art. An example of a pump of this type and an example of a connection of the pump to the fluid reservoir are described in WO2009/104992. The skilled person will understand that although the elongated and elastic tube chamber 300*b* is an example of a pump 300*b* of the second type, other types of pumps of the second type may also be used in the context of the present disclosure, including pump of a flexible or resilient pump chamber of other shapes than an elongated and elastic tube chamber 300*b*.

Figure 6A:
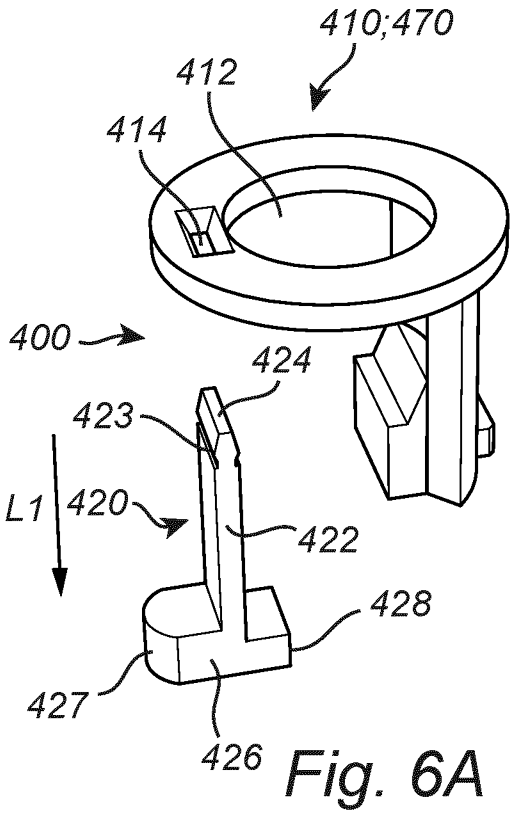
FIGS. 6A to 6C show perspective views of an embodiment of an adaptor assembly.
Figure 6B:
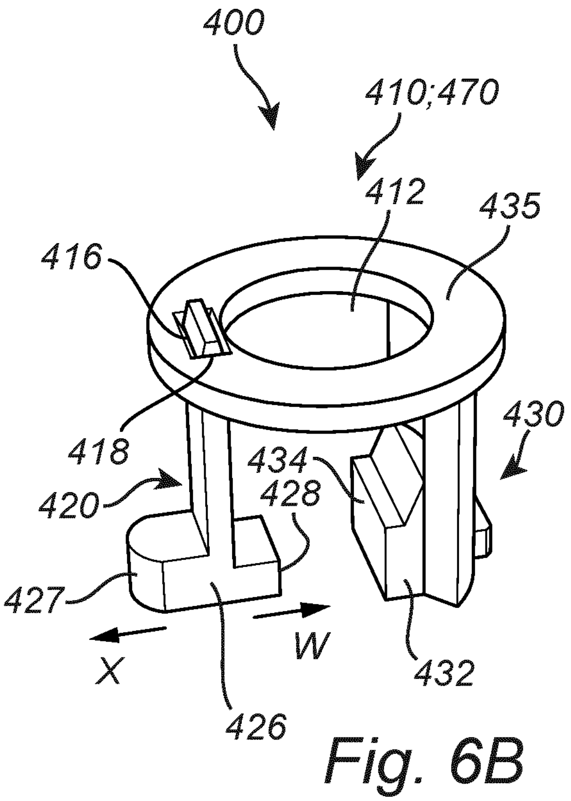
Figure 6C:
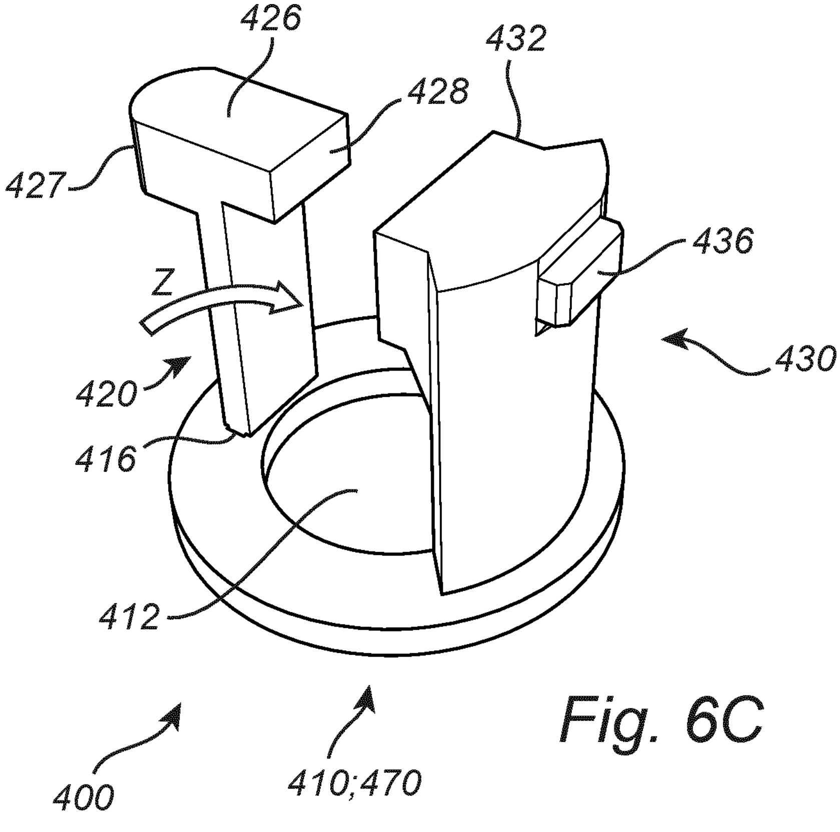

FIGS. 6A-6C show an embodiment of an adaptor assembly 400 to be used with a fluid container 200 with a pump 300*b* of the second type, in particular the fluid container 200 with the elastic and elongated tube chamber 300*b* as shown in FIG. 5.

The adaptor assembly comprises a connecting support forming the first connecting support 410 of the present disclosure for removably connecting the adaptor assembly to the fluid dispensing system 1. As shown in FIGS. 6A-6C, the first connecting support 410 is a disc-shaped plate 410;470 with a central through opening 412 cross the main plane of the plate. The plate has a shape and outer dimensions to allow it to rest on seat of the dispenser 100 formed by the shelves 130 and 131 of the dispenser 100 as well as to be engaged with the locating groove 135 at the rear shelf 131 on the rear portion 110 of the dispenser 100 as described herein in relation to FIGS. 3 and 8. The thickness of the plate is also selected to match the engagement means described in more detail herein below, see FIG. 7. The illustrated connecting support also forms a fluid container support 470 configured to be received in the compartment 150 of the dispenser 100 for holding the fluid container 200 in a desired position in the compartment 150 of the dispenser 100. This is provided by the central through opening 412 having a circular shape matching the dimensions and shape of the connector cap 360 as shown in FIG. 5. The plate forms a seat for the connector cap 360 to rest on by a laterally protruding flange 368 configured at the upper end of the connector cap 360, the flange 368 contacting and resting on a portion of an upper surface 435 of the plate close to the through opening 412 thereof and the remaining portion 367 of the connector cap 360 below the flange 368 is configured to protrude downwards through the through opening 412 of the plate. See FIGS. 5 and 6A-6C.

The skilled person will understand that although the disc-shaped plate 410;470 with the central through opening 412 is an example of a connecting support as well as a fluid container support 470 to be used in the context of the present disclosure, other types of connecting supports and fluid container supports 470 for the fluid container 200 may be used in the context of the illustrated adaptor assembly 400, including supports of other shapes than the disc-shaped plate with the central through opening 412, including but not limited to plates having in part a circular shape with two or more straight edges or an outer polygonal shape such as an hexagonal or octagonal shape still having portions resting on the seat of shelves 130 and 131 of the dispenser 100. The skilled person also appreciates that the circular through opening 412 may adopt other shapes, including but not limited to a polygonal shape that still may form the seat for fluid container 200 and the connector cap 360 or the like. The skilled person also understands that the plate may adopt forms such as one or more U-shaped formed plates or the like adopting the circular shape that the dispenser 100 has in the area of the shelves 130;131, e.g. two C-shaped plates, each configured to rest on the respective shelf 130; 131 and having an outer shape matching dispenser surrounding. These plates may be kept together by one or more connecting means or portions, means arranged below or above the plates and connected to suitable plate surfaces.

The adaptor assembly 400 further comprises an actuation part 420 as shown in FIGS. 6A-6C. The actuation part 420 includes an elongated arm 422 extending in a longitudinal direction (L1) thereof between two opposite ends of the arm. The first end 424 is configured to form a snap connection 414 with a corresponding recess 414 in the disc-shaped plate in an area between an edge and the central opening 412 of the plate to allow the actuation part 420 to be connected to the first connecting support 410. The arm 422 will then extend in a direction (L1) forming an angle to the main plain of the plate. A second end of the arm carries an actuation head 426 comprising a first contact surface 427 for abutting against the user actuator 124 and a second contact surface 428 for abutting against the pump 300*b* of the second type. The actuation head 426 projects outwardly from the second end of the arm in two opposing directions (W;X) being substantially perpendicular directions to the longitudinal direction (L1) of the actuation arm 422 to form the first and second contact surfaces 428;427 facing away from each other. The first contact surface 427 is convex in its shape to allow a contact to the actuator 124 in a form-fit manner.

The snap connection is configured to form a second pivot 418 in the fluid dispensing system 1, wherein the actuation part 420 can pivot about the second pivot 418. The pivot function is provided by forming two tapering portions 423 on opposite sides of the arm close to the first end 423 that snap into the recess 414 that is tapering from both sides of the plate, wherein a pivotal movement of the arm 422 becomes possible along one plane. In this way, actuation part 420 can pivot about the second pivot 418 and allow the head to be moved along a rotation direction (Z) between a non-actuated position and a fully actuated position, to allow fluid to be dispensed from the fluid container 200, when the adaptor assembly 400 is mounted in the dispenser 100 together with the fluid container 200.

The skilled person will understand that although the actuation part 420 being pivotally connected to the connecting support and having the actuation head 426 is an example of a actuation part 420 being movably connected to the connecting support and carrying the two connection surface, pump 300*b* of the second type, other actuation parts of this type may be used, including but not limited to other shapes of the head such as a head having a ball-formed shape and a first contact surface 427 being concave to match the pump shape of the second type or convex to better support complete dispensing of the fluid. The skilled person also appreciates that other types of movable connections may be used, including but not limited to a second pivot 418 formed by hinge connection or by a living hinge.

Instead of forming a pivotal connection between the actuation part 420 and the connecting support, the skilled person also envisages that the arm may be fixedly connected to the connection portion and in part or completely be made flexible from the non-actuated position to the fully actuated position in the same direction (Z) as for the actuation part 420 being pivotally connected to the connection part. The skilled person appreciates that the arm may be made flexible by using an elastic and flexible plastic material of olefin plastics such as polypropylene and selecting shapes and dimensions suitable for the purpose.

As further shown in FIGS. 6A-6C, the adaptor assembly 400 comprises a fixed dolly 430 configured to abut against the pump 300*b* of the second type, when mounted in the fluid dispensing system 1. The dolly 430 is fixedly connected to the disc-shaped plate on the same side of the plate as the actuation part 420, but at an opposing side of the central through opening 412 of the plate. The dolly 430 comprises a supporting structure extending from the plate in a perpendicular direction to the main plan of the plate to a portion having a protruding portion 432 thereof extending towards the actuation part 420 with a dolly surface 434 configured to abut the pump 300*b* of the second type, wherein the dolly surface 434 faces the actuation part 420. In this configuration, the pump 300*b* of the second type is able to be positioned between the second contact surface 428 of the actuation part 420 and the fixed dolly 430 and, when a force is applied to the actuation part 420 to move the actuation head 426 towards the pump, the pump 300*b* is compressed between the second contact surface 428 of the actuation head 426 and the dolly surface 434 causing fluid to be dispensed from the pump. In FIGS. 6A-6C, the dolly surface 434 is shown as flat. The skilled person appreciates that the dolly surface 434 may adopt any suitable shape for acting as a fixed dolly 430 and matching the second surface of the actuation part 420, e.g. the dolly surface 434 may adopt an inclined, rounded, convex or concave surface. The dolly 430 may be divided into several dolly portions or fixed dollies, each presenting a dolly surface 434. In this way the fixed dolly 430 may be adjusted to provide the proper counter force to the actuation part 420 for providing a proper dispensing action.

A protruding pin 436 is provided at a surface facing away from the dolly surface 434. As will be further illustrated in FIGS. 8A to 8B and related description hereinbelow, this pin 436 acts as a positioning means for engaging corresponding recess 142 in the rear portion 110 of the dispenser 100 and this provides a correct positioning of the adaptor assembly 400 in the dispenser 100 during the assembly of the fluid dispensing system 1. The engagement between the pin 436 and recess 142 also prevents a rotational movement of the adaptor assembly 400 in the dispenser 100, in which the adaptor assembly 400 is mounted. The skilled person appreciates that the positioning means may adopt any suitable shape or form that may assist in the positioning of the adaptor assembly 400 in the dispenser 100 and in preventing any movement of the adaptor assembly 400 in the dispenser 100, e.g. by providing frictional contact between the adaptor assembly 400 and the dispenser 100 of any other shapes that in a for-fit manner prevents the rotational and/or axial movement of the adaptor assembly 400 mounted in the dispenser 100. The positioning means may also be configured at other parts of the adaptor assembly 400. Further examples of positioning means will be described hereinbelow.

Suitable materials for forming the adaptor assembly may be aluminum or any suitable plastics such as olefin plastics, e.g. polyethylene or polypropylene. The adaptor assembly may be formed by injection molding, 3D printing or any other suitable method known to skilled person. The mentioned materials and forming of the assembly can be used for all embodiments described herein.

Furthermore, the described adaptor assembly may have the following examples of dimensions. The circular plate may have an outer diameter of 50 mm and the diameter of the through opening may be 31 mm. The thickness of the plate may be 4 mm, which provides a frictional holding by the engaging means 140 described hereinbelow. The actuation part extend from the plate with a length of 38 mm and the dolly extends from the plate with a length of 39 mm. The dolly surface has a width of about 12 mm and a height of about 13 mm. The second contact surface has a width of about 13 mm and a height of 9 mm. The diameter of the elongated and elastic tube chamber may be 14 mm and a length from the cap of about 56 mm.

Figure 7:
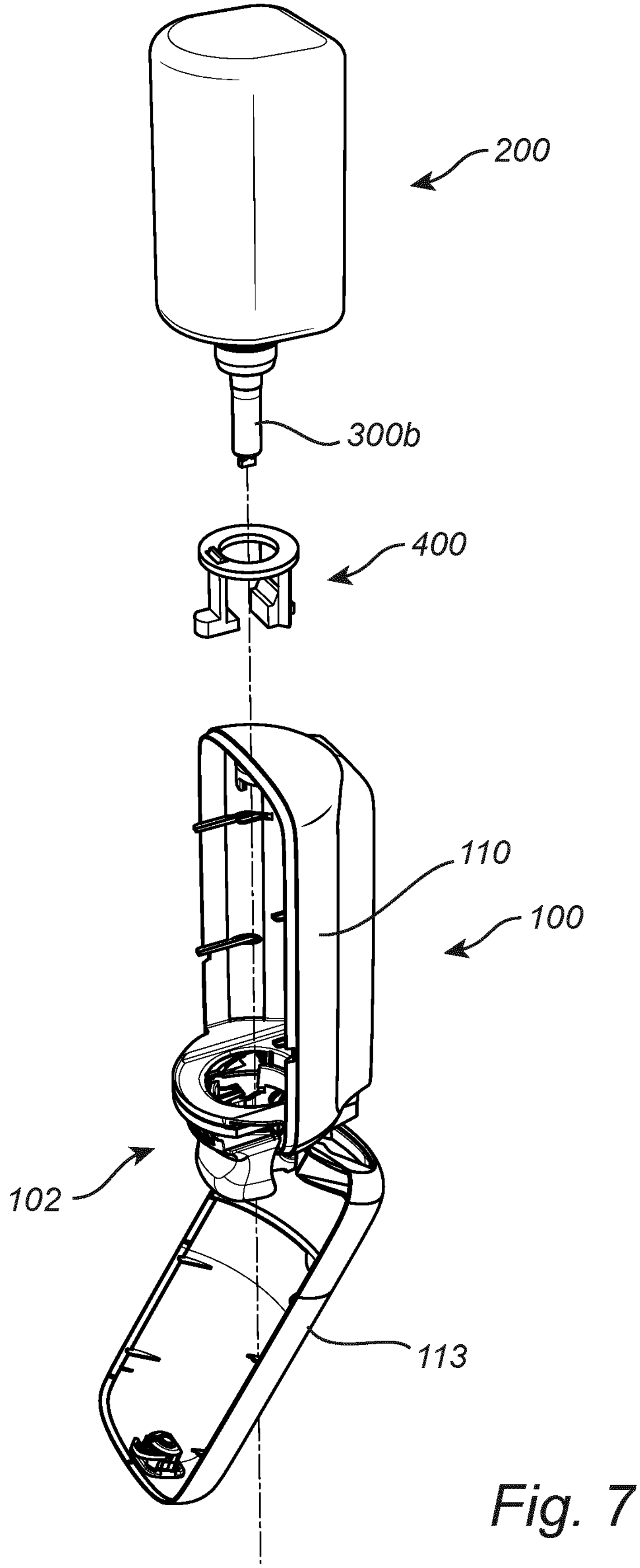
FIG. 7 shows schematically an assembly of a fluid dispensing system including the dispenser of FIG. 1, a disposable container of FIG. 5 and the adaptor assembly of FIGS. 6A to 6C.

FIG. 7 schematically illustrates an assembly of a fluid dispensing system 1 including the dispenser 100 of FIG. 1, a disposable container of FIG. 5 and the adaptor assembly 400 of FIGS. 6A-C.

Figure 8A:
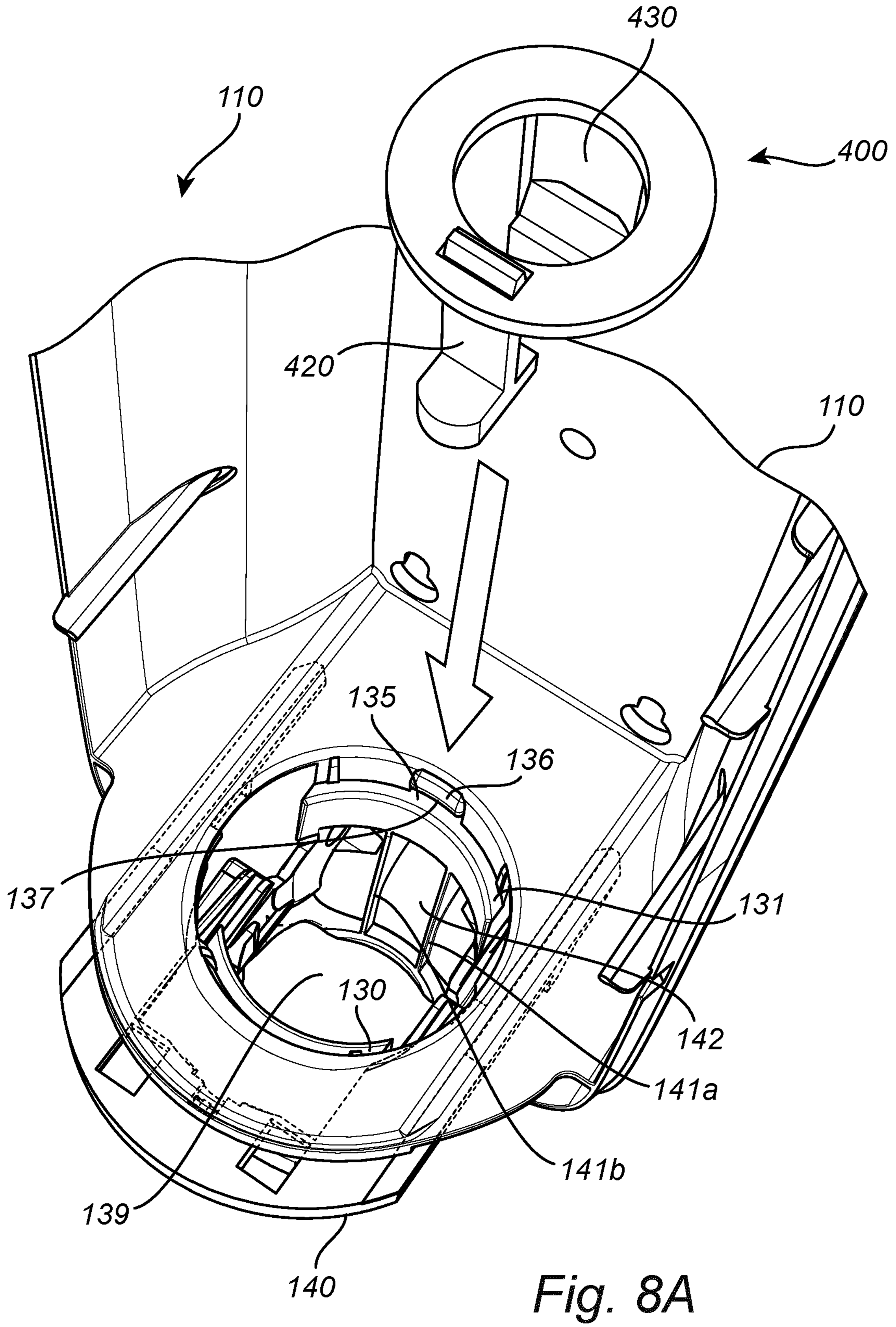
FIGS. 8A to 8C show a perspective view of an enlargement a lower rear portion of the fluid dispensing system of FIG. 7 view from an angle above to show details of the interior of the fluid dispensing system and the assembly of the adaptor assembly of FIGS. 6A to 6C into the fluid dispenser shown in FIG. 1.
Figure 8B:
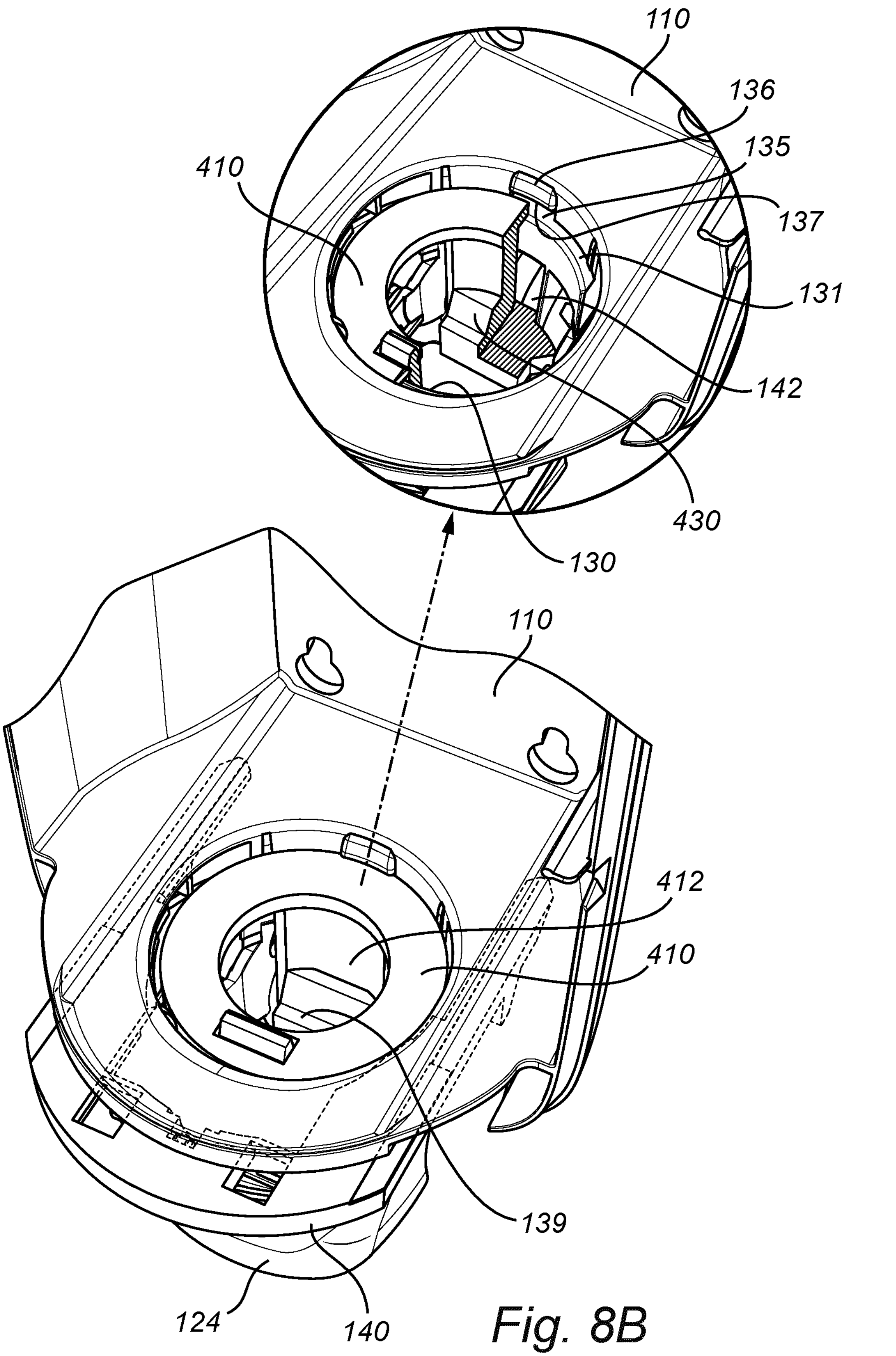
Figure 8C:
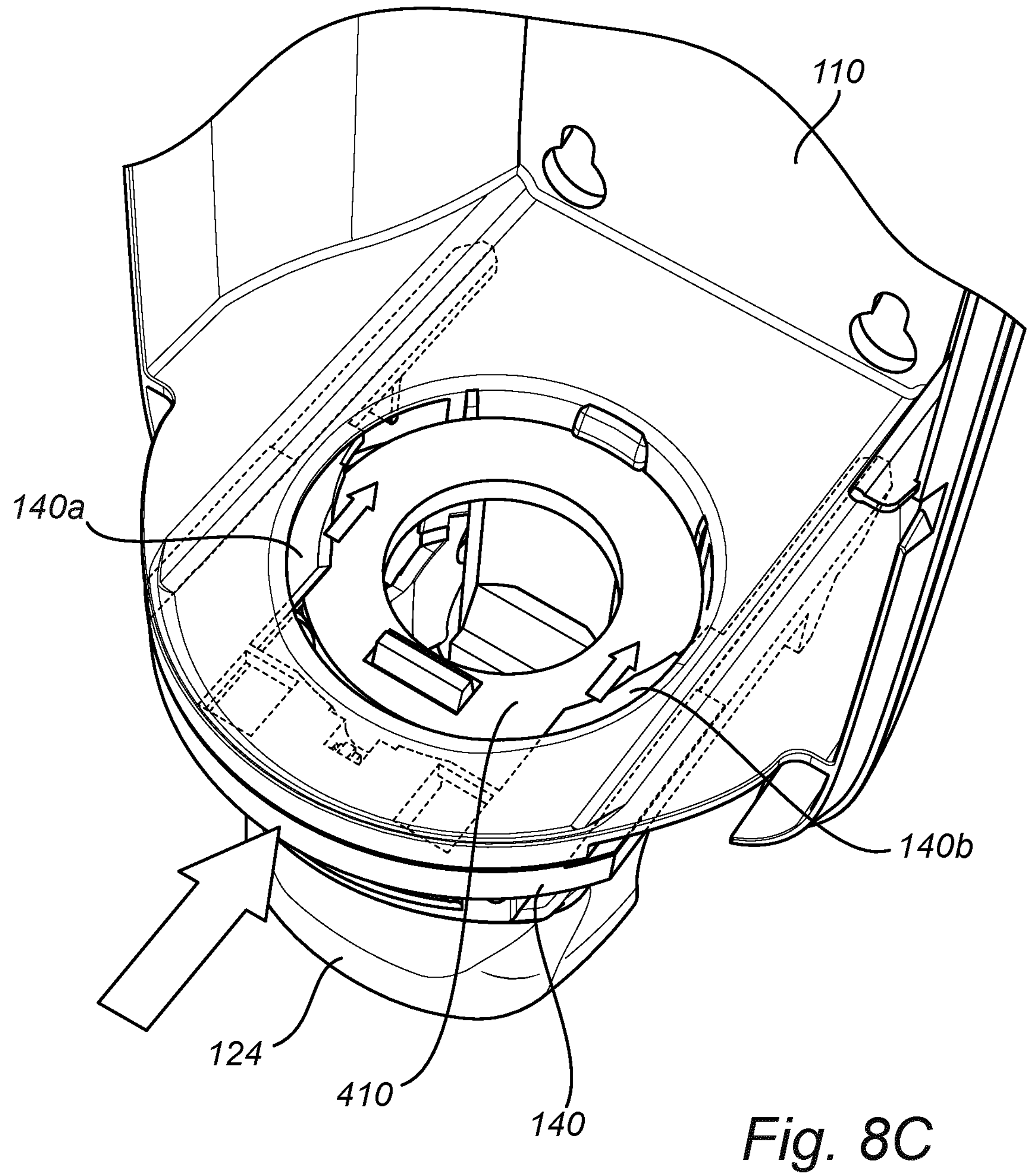

At the front portion 112 of the dispenser 100, the housing forms a front cover 113 being pivotally connected to the rear portion 110 at the lower portion 102 thereof. The front cover 113 is opened by unlocking the lock 118 at the upper end thereof and rotating the cover about its pivot at the lower end to expose the interior of the dispenser 100. At the lower portion of the rear portion 110 is the portion for holding fluid container 200 and the pump. The adaptor assembly 400 is mounted in the dispenser 100 by inserting it through a holding opening 139 for holding the fluid container 200 at the lower portion 102 of the dispenser 100 as best shown in FIGS. 8A-8C, showing enlarged views of the lower portion of the interior inside the dispenser 100 with and without the adaptor assembly 400 inserted and fixed in the dispenser 100 as viewed from an angle above towards the rear portion 110 of the lower portion 102. As shown in FIG. 8A, the holding opening 139 is of circular shape and the rear portion 110, the rear shelf 131, locating groove 135 formed between the rear shelf 131 and a pin 136 are arranged at the rear portion 110 as described hereinabove in relation to FIG. 4A and to the fluid container 200 with the pump 300*a* of the first type.

As also shown in FIG. 8A, the locating groove 135 extends rearwardly through an opening 137 formed in the wall of the rear portion 110 to form a positioning opening 137. The purpose of this positioning opening 137 will be explained in more detail below in relation to other embodiments of the adaptor assembly 400.

Below the holding opening 139 at the lower portion 102 forming the part for housing the fluid pump of a fluid container 200, the rear portion 110 has two vertical flanges 141*a*; 141*b* extending therefrom towards the front. These flanges form a positioning recess 142 therebetween. The adaptor assembly 400 is inserted into the holding opening 139 with the side of the connection part/plate carrying the actuation part 420 and the fixed dolly 430 facing downwards towards the lower portion 102 of the dispenser 100 and with the fixed dolly 430 being positioned towards the rear portion 110 of the dispenser 100. When the adaptor is fully inserted, the first connecting support 410 in the form of plate rests on the front and rear shelves 130;131 and engages the locating groove 135 between the rear shelf 131 and a pin 136, see FIG. 8B including the enlarged portion thereof. Furthermore, the protruding pin 436 of the fixed dolly 430 engages the positioning recess 147 formed by the vertical flanges 141*a*; 141*b* in the rear portion 110 of the dispenser 100. This engagement provides a correct positioning of the adaptor assembly 400 in the dispenser 100 during the insertion of the adaptor assembly 400 in the fluid dispenser 100. The engagement between the pin 436 and recess 147 also prevents a rotational movement of the adaptor assembly 400 in the dispenser 100.

As also shown in FIGS. 8A-8C, the dispenser 100 includes engaging means 140 for holding the disc-shaped plate in place in the dispenser 100. As the disc-shaped plate also forms the fluid container support 470 in this embodiment, the provision of the engaging means 140 also provides means for holding the fluid container support 470 in place when inserting the fluid container 200 into the dispenser 100, using the dispenser 100 and removing the fluid container 200 from the dispenser 100. The skilled person appreciates that the engaging means 140 now described can be used together with any fluid container support 470 described herein.

The engaging means 140 comprises an element being displaceable between a non-holding position to a holding position. The illustrated engaging means 140 is a C-shaped element that is displaceable in a horizontal plane from the non-holding position as shown in FIG. 8B in a rearward direction to the holding position as shown in FIG. 8C. In the holding position, the engaging means 140 has portions 140*a*, 140*b* engaging with the disc-shaped plate. The plate may have thickness that provides the engaging means 140 to be locked in the holding position by a frictional interaction with the plate. The skilled person understands that the plate may also comprise a pattern of cut-outs or protrusions which engages with the engaging means 140.

The skilled person understands that engaging means 140 can take a number of forms, e.g. a bayonet-type fitting, a screw fitting, one or more moveable jaws or a “click”-fitting in the dispenser 100 into which the adaptor assembly 400 or fluid container support 470 engages. The engaging means 140 may be a fixed component of the dispenser 100 or may be moveable within said dispenser 100. If the engaging means 140 is moveable within the dispenser 100, it may be sprung or otherwise resiliently arranged such that it is displaced upon insertion of the adaptor assembly 400 into the dispenser 100, but returns to an engaged position upon correct placement of the fluid container 200. Engaging means 140 may also be manually activated as the shown example is. The engaging means 140 may comprise one or more angled surfaces which promote correct insertion and engagement of the fluid container 200 in the dispenser 100.

Figure 9A:
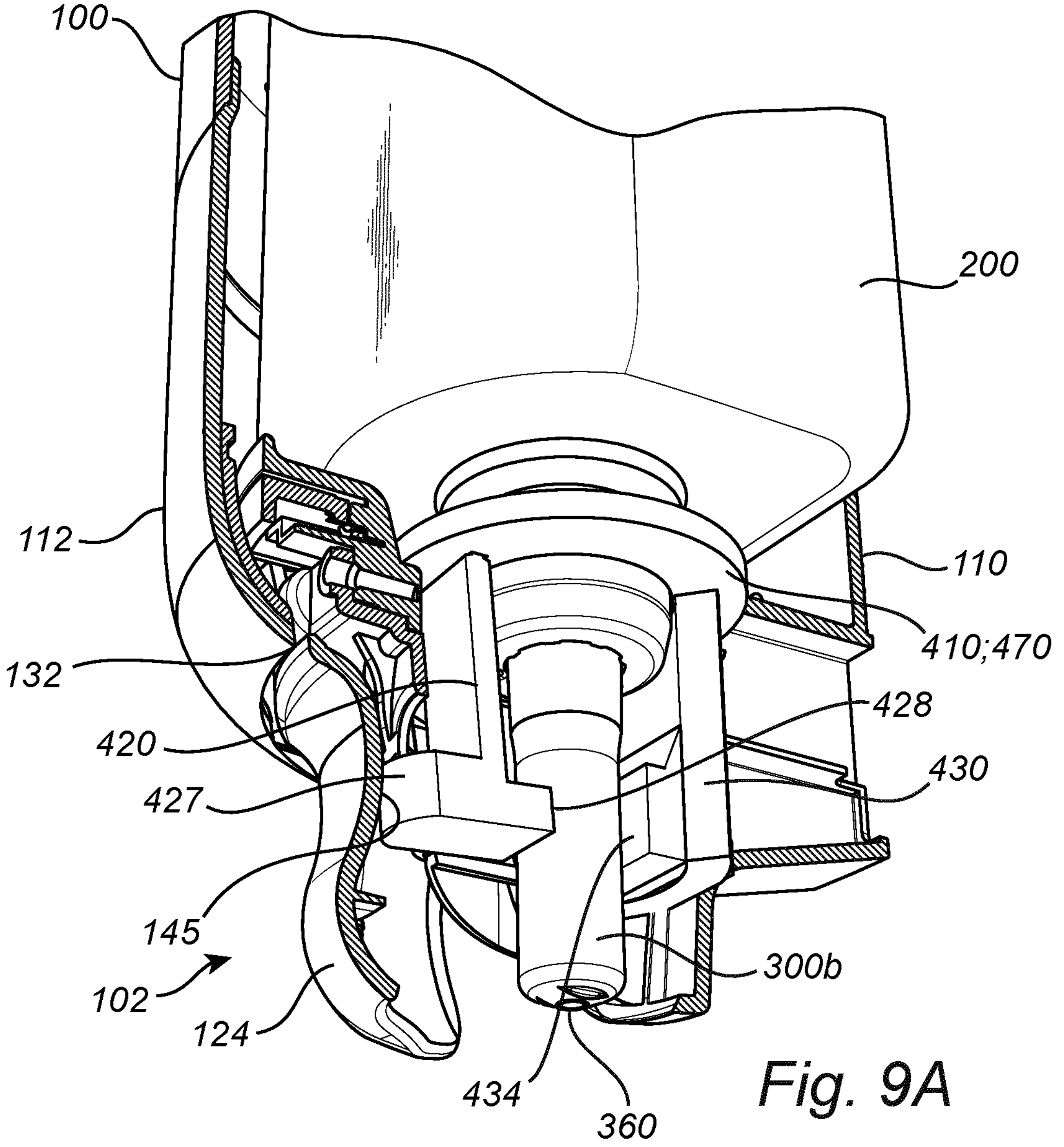
FIGS. 9A to 9B show a perspective view of a lower portion of the fluid dispensing system formed from the parts shown in FIG. 7 with a portion of the dispenser cut away to show details of the interior of the fluid dispensing system in operation.

As schematically illustrated in FIG. 7, the next step in the assembly of the fluid dispensing system 1 is to insert the fluid container 200 into the dispenser 100 now holding the adaptor assembly 400. The fluid container 200 is inserted with its pump of an elongated and elastic tube chamber 300*b* into the central through opening 412 of fluid container support 470 being the disc-shaped plate until the connector cap 360 of the fluid container 200 with its flange 368 rests on the seat formed in the dispenser 100 as described hereinabove and also envisaged from FIG. 9A. FIG. 9A also illustrates that the fluid container 200 is inserted so that the elongated tube of the pump is placed between the second surface of the actuation part 420 and the dolly surface 434 of the fixed dolly 430.

The assembly of the fluid dispensing system 1 is then finalized by closing the dispenser 100 by moving the upper portion of the front cover to the rear portion 110 and, optionally locking the cover to the rear portion. The dispenser 100 is then ready for use.

Figure 9B:
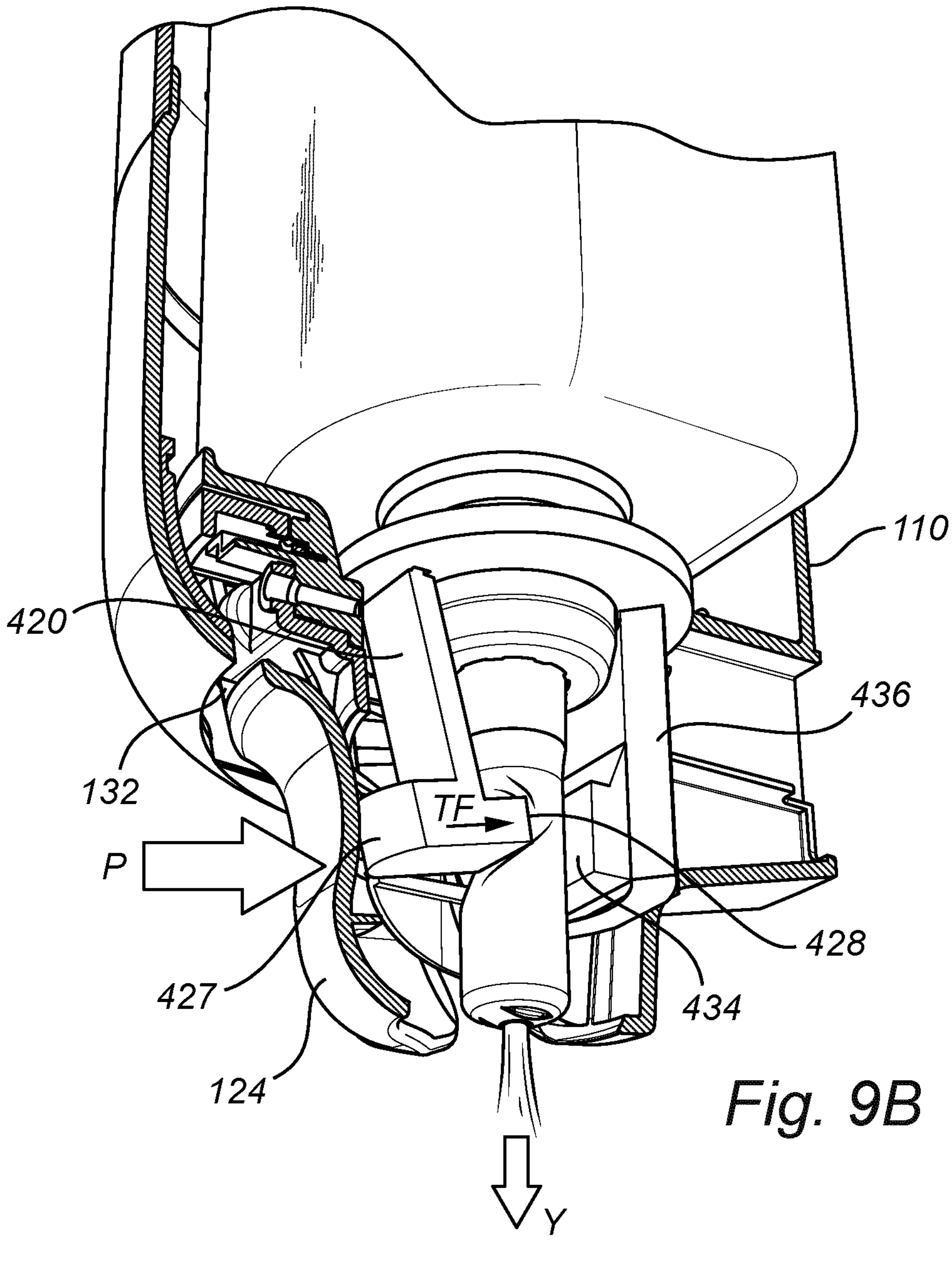

FIGS. 9A and 9B show a perspective view of a lower portion 102 of the fluid dispensing system 1 of FIG. 7, when assembled to a fluid dispensing system 1 as shown in FIG. 1, with a portion of the dispenser 100 cut away to show details of the interior of the fluid dispensing system 1 in operation.

According to FIG. 9A, the fluid container 200 rests on its seat in the dispenser 100 that is formed by the disc-shaped plate forming the fluid container support 470 of the adaptor assembly 400 being removably mounted in the dispenser 100. The fluid pump 300*b* of the second type being an elongated and elastic tube chamber 300*b* extends downwards from the fluid container 200 and between the second surface of the actuation part 420 and the dolly surface 434 of the fixed dolly 430 to the nozzle 365 at the bottom of the dispenser 100. The nozzle 365 is placed at the lowermost part of the dispenser 100 so as to prevent the risk of having any dispensing part contaminated upon dispensing any fluids from the fluid container 200, but at the same time not being clearly visible for a user, when using the dispenser 100. The position of the nozzle 365 depends on, for example, the dimensions of the fluid container 200 and the position the fluid container 200 can have in the dispenser 100. The skilled person appreciates how to adopt the fluid container support 470 or its position so as to adjust the position of the nozzle 365. The adaptor assembly 400 may also be modified to adjust the position it has in relating to pump as well as to the shape of the pump and the maximum volume desired to be dispensed from the fluid container 200. Some examples of dimensions and shapes of the adaptor assembly 400 have been presented hereinabove for the embodiment now shown in FIG. 9A. These dimensions and shapes may be envisaged for other embodiments shown herein. For example, the dimensions of the actuation head 426 and the fixed dolly 430 are adjusted so that a pump placed therebetween in the dispenser 100 and in the non-actuated position should be in non-compressed and non-distorted form, and still providing a sufficient dispensing when actuated.

In FIG. 9A, the actuator 124 is pivoted at first pivot 132 to the front portion 112 and includes a contact surface 145 that faces the compartment 150 of the dispenser 100 and is configured to abut the first contact surface 427 of the actuation part 420. The surface 145 of the actuator 124 is concaved-shaped to match the convex-formed first contact surface 427. In this view, the actuation part 420 is kept in its non-actuated position between the actuator 124 and the elongated and elastic tube chamber 300*b* forming the pump 300*b* of the second type.

FIG. 9B shows the fluid dispensing system 1 once a user by the hand has exerted a force P on actuator 124, wherein user actuator has displaced the actuation part 420 and the actuation head 426 from its non-actuated position towards an actuated position, and thereby transferred an actuation force TF from the actuation part 420 via the second surface to the pump. The pump has been laterally compressed towards the rear portion 110 of the dispenser 100 and the dolly surface 434. This has caused fluid to be dispensed downwardly in a direction Y from the fluid container 200. In this view, the actuator 124 has rotated anti-clockwise about the first pivot 132 to cause the actuation of the dispenser 100. Once the user removes the hand from the actuator 124, the actuator rotates clockwise toward the front portion 112 to the position it had before the user exerted the force P on it. The actuation part 420 is then returned to its non-actuated position, when refilling of the pumping chamber occurs by the provision of a filling force being provided by the inherent resilience of the wall of the pumping chamber (not shown).

Figure 10A:
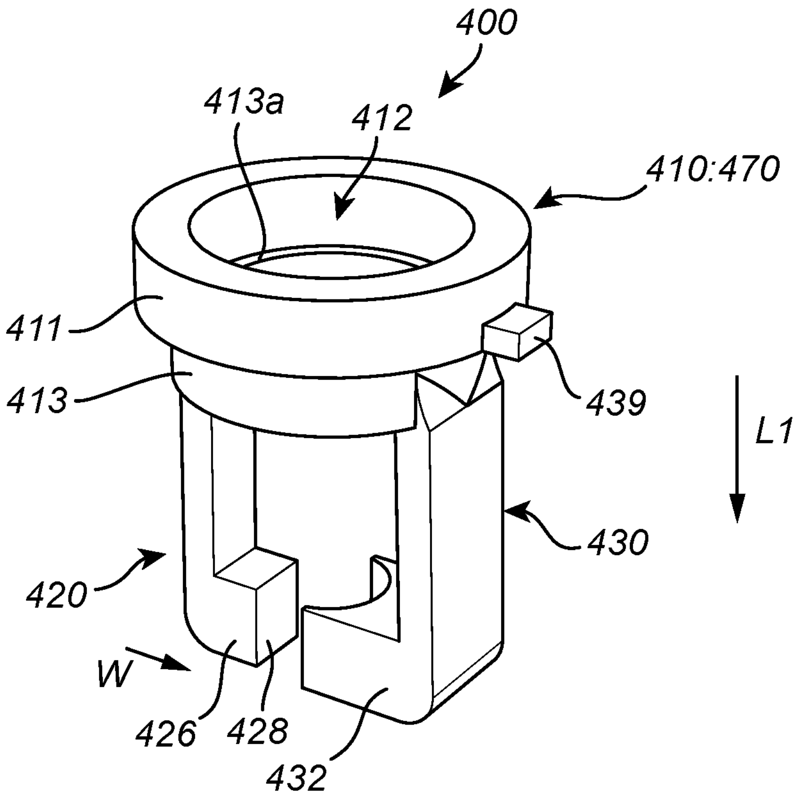
FIGS. 10A and 10B are perspective views of an embodiment of an adaptor assembly.
Figure 10B:
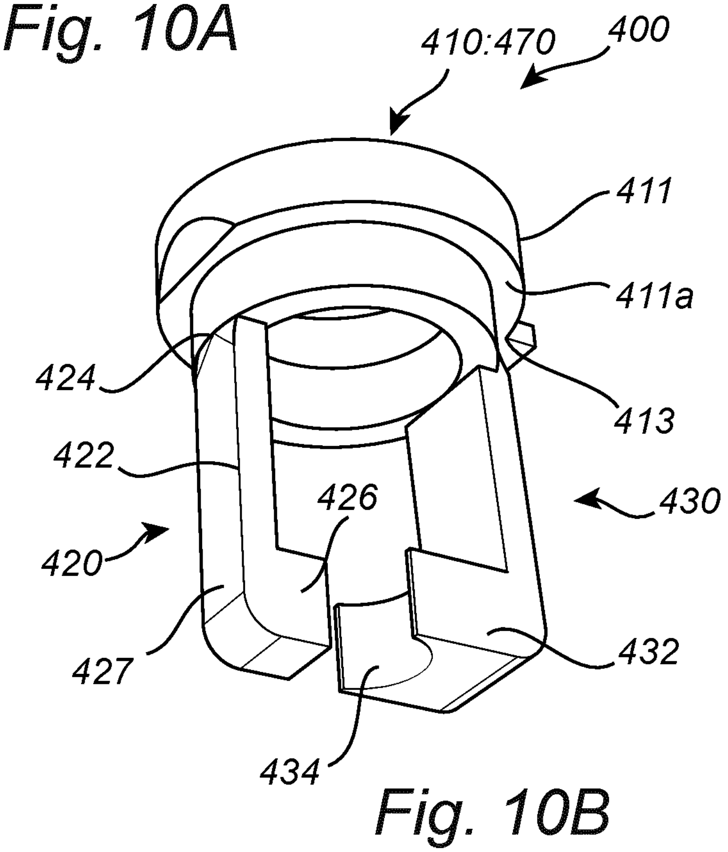

FIGS. 10A to 10B show an embodiment of an adaptor assembly 400 to be used with a fluid container 200 with a pump 300*b* of the second type, in particular the fluid container 200 with the elastic and elongated tube chamber 300*b* as shown in FIG. 5.

The adaptor assembly 400 is in general similar to the embodiment shown in FIGS. 6A to 6C, with a few differences only. A first difference is the shape of the actuation part 420. In this embodiment, the actuation part 420 is substantially L-shaped in its form with an elongated arm extending in a longitudinal direction (L1) thereof between two opposite ends of the arm. A first end is connected to the first connecting support 410 in any of the ways described in relation to the embodiment of FIGS. 6A to 6C, i.e. it may be pivotally connected or fixedly connected to the first connecting support 410. In the case it is fixedly connected to the first connecting support 410, the arm may be made flexible or elastic to allow the movement towards the fixed dolly 430. A second end of the arm carries an actuation head 426 comprising a first contact surface 427 for abutting against the user actuator 124 and a second contact surface 428 for abutting against the pump 300*b* of the second type. The actuation head 426 projects outwardly from the second end of the arm in one direction (W) being a substantially perpendicular direction to the longitudinal direction (L1) of the actuation arm to form the actuation head 426 with first and second contact surface 427;428 facing away from each other. The first contact surface 427 is here shown as an elongated planar surface for contacting a lateral flange 147 on the actuator 124 and provide a gliding surface for this flange 147, see FIG. 10C. However the shape may be modified to allow a desired contact with the flange 147 or to adopt any shape for suitably contacting a surface of the actuator 124 in a form-fit manner, e.g. to adopt the shape shown in FIG. 6B and allow the first contact surface 427 to be in contact with an actuator surface 145 just above the flange 147. The second contacting surface 428 is in this embodiment also shown as being planar. As discussed hereinabove, it may have other shapes suitable for contacting the pump.

In this embodiment, the connection support forms a circular sleeve 410 instead of a disc-shaped plate. However, this shape will in a form-fit manner rest on the same seat in the dispenser 100 as the disc-shaped plate does. This shape may provide some extra rigidity to the first connecting support 410. It may also provide some additional stabilization for the fluid container 200 supported by the connecting support being a fluid container support 470 as compared to the disc-shaped plate hereinabove. Nevertheless, the sleeve 410;470 provides a seat for the fluid container 200 in a similar way as the disc-shaped element. The sleeve contains an upper part 411 and a lower part 413, the upper part 411 having an outer diameter as well as an inner diameter that are both larger than respective dimension of the lower part 413. In this way, the sleeve forms a circular surface 411*a* facing downwards from the upper part 411 and configured to rest on the front and rear shelves 130;131 of the dispenser 100. In the axially extending through opening 412 of the sleeve, there is provide an upwardly facing circular edge surface 413*a* configured to form a seat for the flange 368 of the connector cap 360 of the fluid container 200 to rest on. Thus, the lower part 413 is configured to be positioned in the holding opening 139 below the area of the shelves 130;131. This may provide some stabilization of the adaptor assembly 400 when mounted in the dispenser 100 as well as for the fluid container 200 inserted therein. The sleeve will also encompass the fluid container 200 on the sides thereof.

Figure 10C:
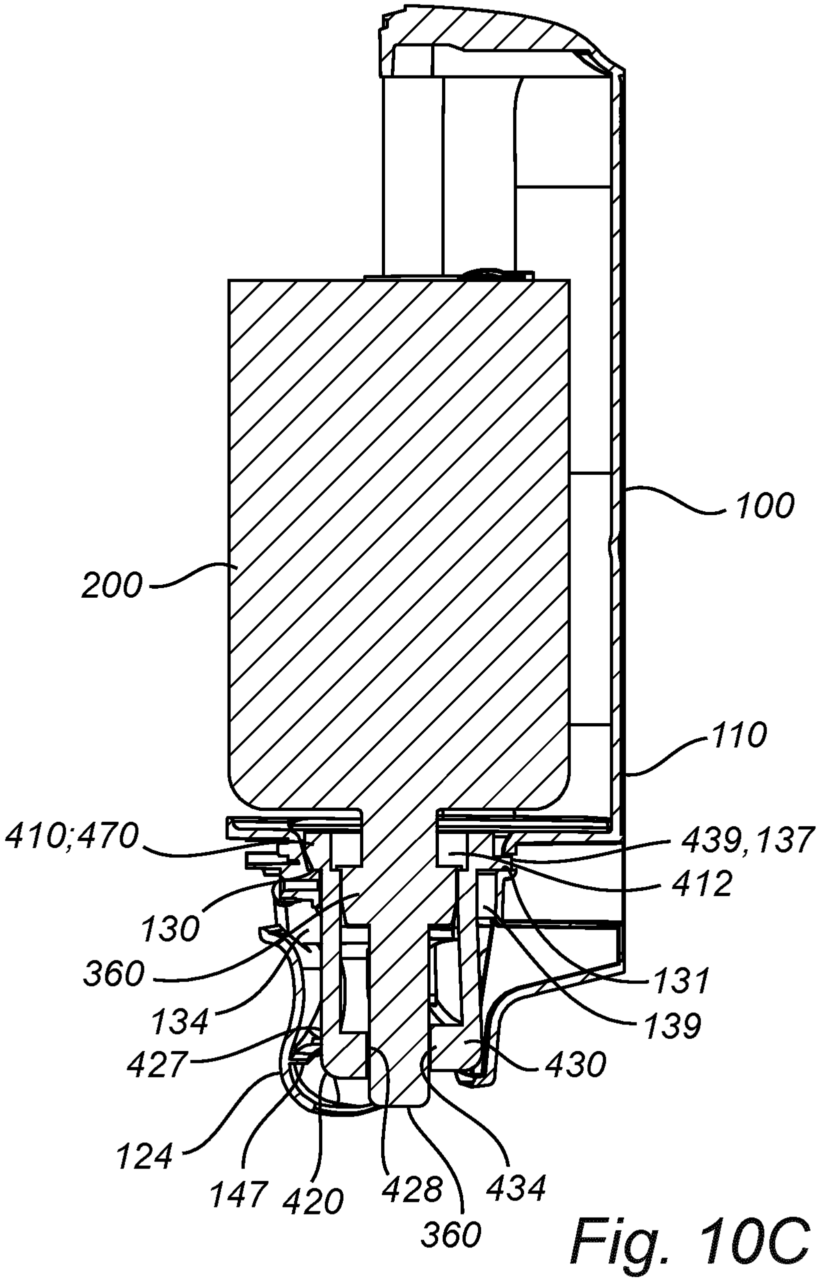
FIG. 10C show a partial cross-sectional view of an embodiment of a fluid dispensing system comprising the adaptor assembly of FIGS. 10A and 10C and the fluid container of FIG. 5.

Furthermore, a pin 439 extends rearwards from the upper part 411. This pin 439 acts as a positioning means for engaging the corresponding positioning opening 137 formed in the rear portion 110 at the locating groove 135 as shown in FIGS. 8A and 10C. The engagement between the pin 439 and the positioning opening 137 provides a correct and simple positioning of the adaptor assembly 400 in the dispenser 100 during the insertion of the adaptor assembly 400 in the fluid dispenser 100. The engagement between the pin 439 and the positioning opening 137 also prevents both an axial and a rotational movement of the adaptor assembly 400 and the fluid container support 470 in the dispenser 100, when mounted therein. The adaptor assembly 400 as shown in FIGS. 10A to 10C does not have any positioning means on the fixed dolly 430. However, as for the embodiment of shown in FIGS. 6*a* to 6C, this embodiment may be used with a positioning means arranged on any suitable part, e.g. on the fixed dolly 430, for connecting corresponding parts in the dispenser 100 in a suitable manner.

In FIGS. 10A to 10B, the fixed dolly 430 adopts a L-shaped form with a substantially rigid arm with one end fixedly connected to the bottom of the sleeve. The other end of the rigid arm has a dolly portion extending towards the second surface of the actuation part 420 with a concave dolly surface 434 facing the actuation part 420. The concave surface matches in form the elongated and elastic tube chamber 300*b*. Furthermore, as shown the second surface of the actuation part 420 may have a width a horizontal plane that is smaller than the width of a cavity formed at the dolly surface 434 to allow the actuation part 420 to move into the cavity, when the actuation part 420 is moved to an actuated position. This may provide a good compression of the elongated and elastic tube chamber 300*b* during the dispensing of fluid. As mentioned hereinabove, the shapes of the different surfaces may be selected depending on the type of fluid container 200 used or the desired dispensing of the fluid.

An assembly of a fluid dispensing system 1 including the dispenser 100 of FIG. 1, a disposable container of FIG. 5 and the adaptor assembly 400 of FIGS. 10A to 10B resembles the assembly of the fluid dispensing system 1 including an adaptor assembly 400 shown in FIGS. 6A to 6C. Attention is drawn to the fact that the embodiment shown in FIGS. 10A and 10B has the positioning means in form of pin 439 in a different position than the adaptor assembly 400 shown in FIG. 6A, for example. As mentioned above, the pin 439 shown in FIGS. 10A and 10C is configured to engage the corresponding positioning opening 137 formed in the rear portion 110 at the locating groove 135 as shown in FIGS. 8A and 10C. Thus, the assembly of the adaptor part may then be very simple by just inserting adaptor assembly 400 into the holding opening 139 with the side of the sleeve carrying the actuation part 420 and the fixed dolly 430 facing downwards towards the lower portion 102 of the dispenser 100. The pin 439 as well as the fixed dolly 430 should be positioned towards the rear portion 110 of the dispenser 100 to secure that the pin 439 is inserted in the corresponding positioning opening 137 in the wall of the rear portion 110 and that the sleeve rests correctly on its seats in the dispenser 100, i.e. the shelves 130;131.

The engaging means 140 as shown in FIGS. 8A and 8C may then be used to hold the sleeve in position within the dispenser 100 as described hereinabove for engaging and holding the disc-shaped plate. The fluid container 200 is inserted into the dispenser 100 holding the adaptor assembly 400 in a similar way as described hereinabove, wherein an assembled fluid dispensing system 1 will rest on the sleeve as described above.

As illustrated in FIG. 10C and in an assembled fluid dispensing system 1, the positions of the actuation head 426 as well as the dolly surface 434 is slightly below the corresponding parts of the embodiment shown in FIG. 9A. This changes the position for squeezing the elongated and elastic tube chamber 300*b*. The skilled person appreciates that either position may work depending on the position of the elongate and elastic tube chamber 300*b* and the properties of the tube chamber 300*b*. Furthermore, even though the position is suitable for the shape the actuation part 420 has for allowing the first surface to be in contact with the rearwardly directed lateral flange 147 of the actuator 124, the skilled person appreciates that the head portion of the actuation part 420 with the second surface may be arranged in a more upwardly placed position. The position or shape of the fixed dolly 430 could then be adjusted accordingly.

The operation of the fluid dispensing system 1 including the adaptor assembly 400 of as shown in FIG. 10C resembles in large the operation of the fluid dispensing system 1 illustrated in FIGS. 9A and 9B, except that the actuation part 420 compresses the elongated and elastic tube chamber 300*b* at the lower portion thereof and that the tube is compressed into a cavity formed by the dolly surface 434.

Figure 11A:
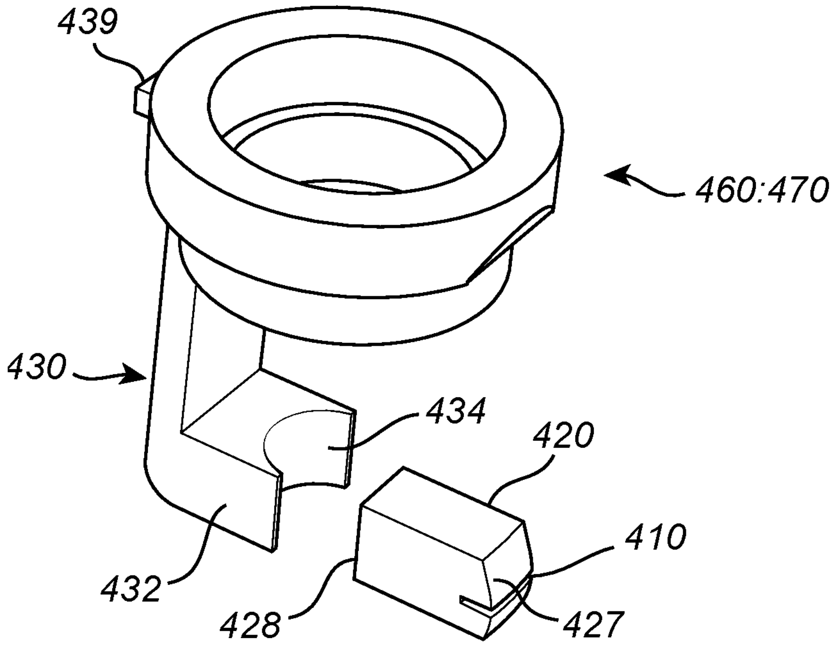
FIGS. 11A and 11B are perspective views of an embodiment of an adaptor assembly.
Figure 11B:
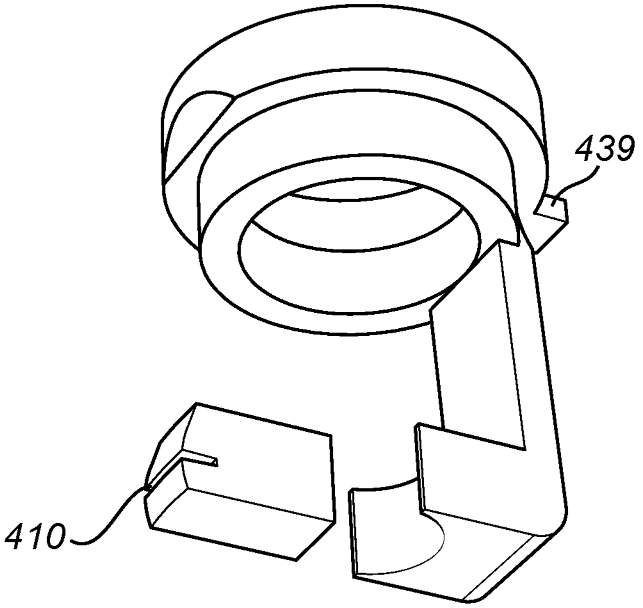

FIGS. 11A to 11B show an embodiment of an adaptor assembly 400 to be used with a fluid container 200 with a pump 300*b* of the second type, in particular the fluid container 200 with the elastic and elongated tube chamber 300*b* as shown in FIG. 5.

This adaptor assembly 400 has two separate parts instead of an adaptor assembly 400 of a single unit as described hereinabove. This provides a simple adaptor assembly 400 with a minimum of material used. The adaptor assembly 400 contains a first part forming the actuation part 420 with a first connection portion in the form of a lateral slit 410 that in a form-fit manner can be attached to a rearwardly directed lateral flange 147 of the actuator 124. The first contact surface 427 of the actuation part 420 close to the slit 410 may also in form match surface areas of the actuator 124 surrounding the flange, when the first part is mounted correctly to the actuator. The general shape of the actuation part 420 corresponds in large to the actuation head 426 shown in FIGS. 10A and 10B.

The second part of this embodiment includes a second connecting support 460 and also acting as a fluid container support 470 with a fixed dolly 430 attached thereto. This second part corresponds to the adaptor assembly 400 shown in FIGS. 10A and 10B with the difference of not containing any actuation part 420.

An assembly of a fluid dispensing system 1 including the dispenser 100 of FIG. 1, a disposable container of FIG. 5 and the adaptor assembly 400 of FIGS. 11A to 11B differs from the assembly of the fluid dispensing system 1 including the embodiment of FIGS. 10A and 10C in that the first part needs to be removably attached to the dispensing system by fitting the slit 410 of the first part to a central portion of the flange 147 of the actuator 124. The attachment of the first part can be carried out before or after the assembly of the second part into the dispenser 100. The attachment of the second part is carried out as described for the adaptor assembly 400 of FIGS. 10A and 10 B. The fluid container 200 is inserted into the dispenser 100 with the second part assembled thereto.

Figure 11C:
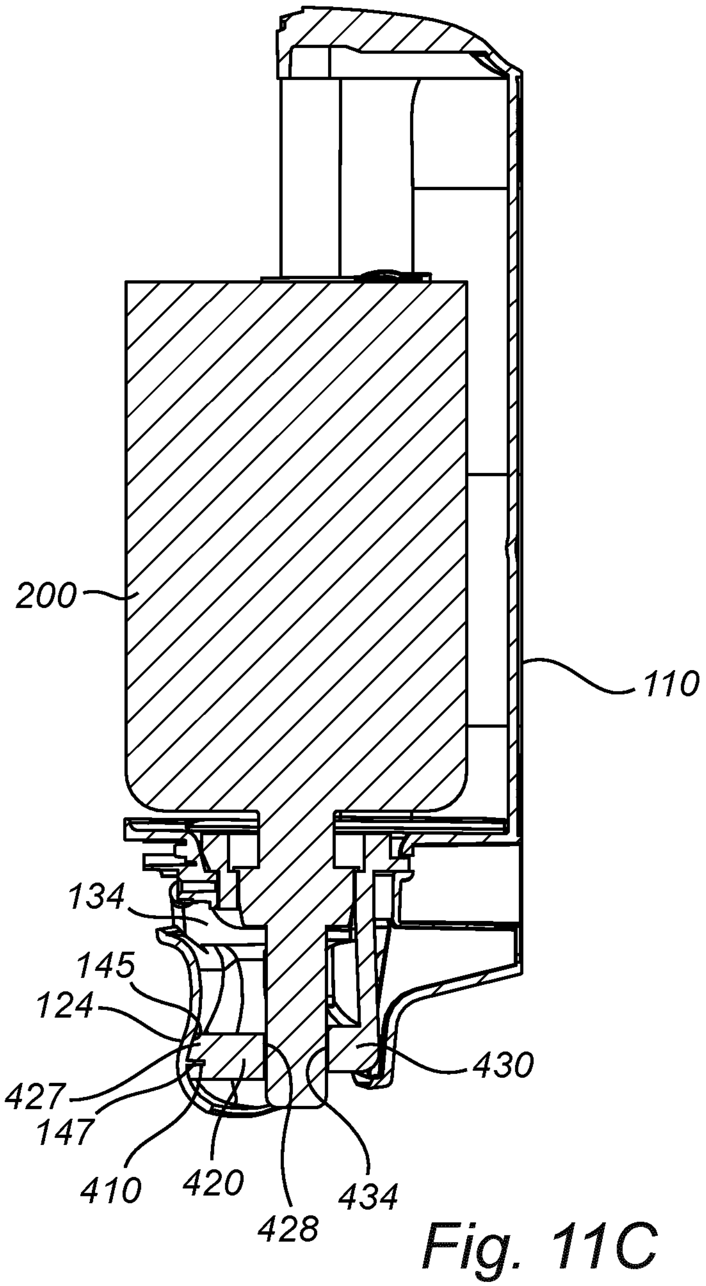
FIG. 11C show a partial cross-sectional view of an embodiment of a fluid dispensing system comprising the adaptor assembly of FIGS. 11A and 11C and the fluid container of FIG. 5.

As illustrated in FIG. 11C and in an assembled fluid dispensing system 1, the positioning of the actuation head 426 as well as the dolly surface 434 is similar to the positions of the corresponding part as shown for the embodiment of FIG. 10C. The skilled person appreciates that the first part forming the actuation part 420 may be shaped to present the second surface in a more upwardly placed position. The position or shape of the fixed dolly 430 could then be adjusted accordingly.

The operation of the fluid dispensing system 1 including the adaptor assembly 400 of as shown in FIG. 11C resembles in large the operation of the fluid dispensing system 1 illustrated in FIGS. 9A and 9B, except that first part forming the actuation part 420 becomes part of the actuator 124 and is movable together with the actuator 124, wherein a user force (P) applied to the actuator 124 displaces actuation part 420 from a non-actuated position to the actuated position, thereby compressing the elongated and elastic tube at lower portion thereof, wherein the tube is compressed into a cavity formed by the dolly surface 434.

Figure 12A:
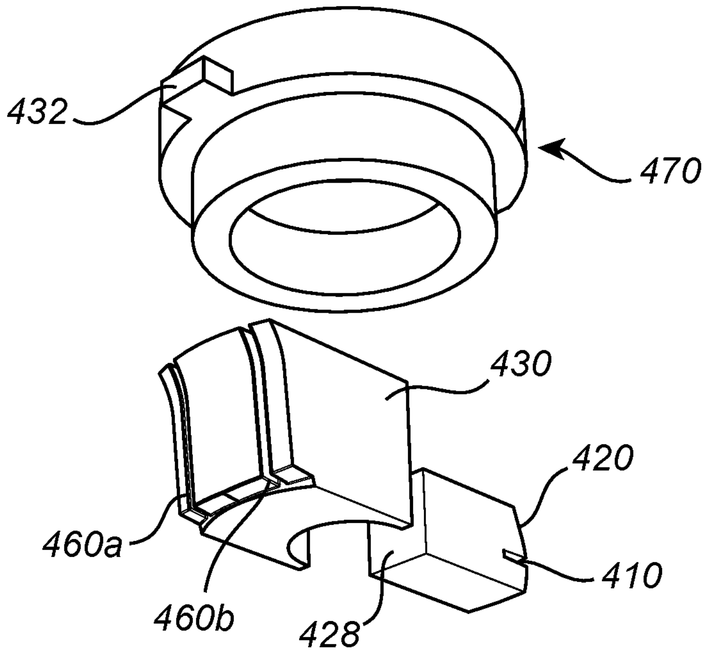
FIGS. 12A and 12B are perspective views of an embodiment of an adaptor assembly.
Figure 12B:
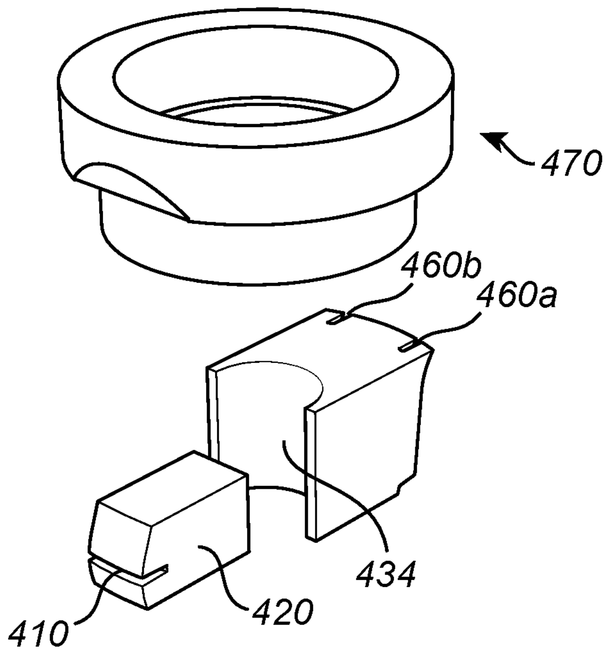

FIGS. 12A to 12B show an embodiment of an adaptor assembly 400 to be used with a fluid container 200 with a pump 300*b* of the second type, in particular the fluid container 200 with the elastic and elongated tube chamber 300*b* as shown in FIG. 5.

This adaptor assembly 400 is divided in three separate parts instead forming an adaptor assembly 400 of two parts or as single unit. This provides a simple adaptor assembly 400 with a minimum of material used. The adaptor assembly 400 contains a first part forming an actuation part 420 with a first connection portion in the form of a lateral slit 410 that in a form-fit manner can be attached to rearwardly directed lateral flange 147 of the actuator 124. The first contact surface 427 of the actuation part 420 about the slit 410 may also in form match surface areas of the actuator 124 surrounding the flange 147, when the first part is mounted correctly to the actuation part 420. The general shape of the actuation part 420 corresponds in large to the actuation head 426 shown in FIGS. 10A; 10B; 11A; 11B.

The second part of this embodiment includes a fixed dolly 430 with a second connecting support 460 in the form of a vertical slits 460*a*;460*b* that in a form-fit manner can be attached to vertical flanges 141*a*;141*b* arranged at the rear portion 110 as described above and shown in FIG. 8A.

This third part corresponds to the sleeve shown in FIGS. 10A and 10B forming a fluid container support 470 only. Thus, this sleeve does not connect to the actuation part 420 and the fixed dolly 430.

An assembly of a fluid dispensing system 1 including the dispenser 100 of FIG. 1, a disposable container of FIG. 5 and the adaptor assembly 400 of FIGS. 12A to 12B differs from the assembly of the fluid dispensing system 1 including the embodiment of FIGS. 10A and 10C in that the three parts of the adaptor assembly 400 needs to be attached to the dispenser 100 separately. The first part forming the actuation part 420 needs to be removably attached to the dispensing system by fitting the slit 410 of the first part to a central portion of the lateral flange 147 of the actuator 124. The second part forming the fixed dolly 430 needs to be removably attached to the rear portion 110 of the dispenser 100 by fitting the vertical slits 460*a*;460*b* of the second part to the two vertical flanges 141*a*; 141*b* arranged at the rear portion 110 in a suitable height matching the height of the first part. The attachment of the third part is in general carried out as described for the adaptor assembly 400 of FIGS. 10A and 10B. The attachment of the different parts to the dispenser 100 can occur in any order before inserting the fluid container 200 into the dispenser 100.

Figure 12C:
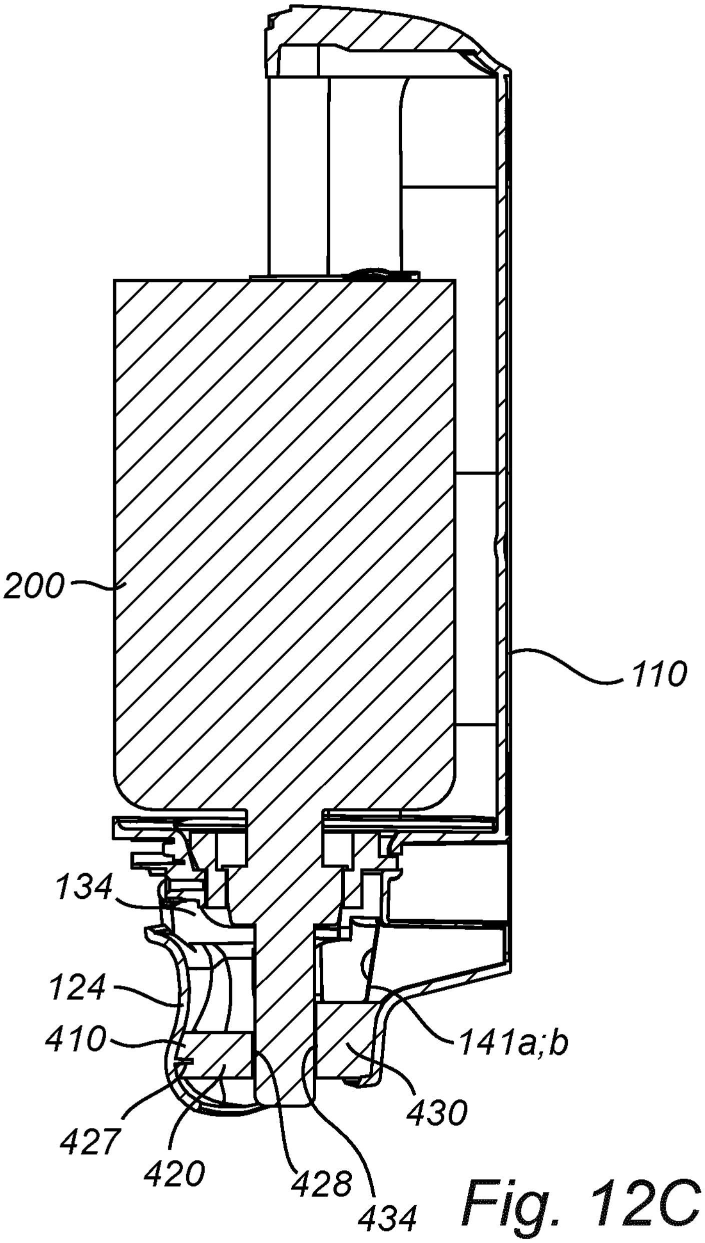
FIG. 12C show a partial cross-sectional view of an embodiment of a fluid dispensing system comprising the adaptor assembly of FIGS. 12A and 12C and the fluid container of FIG. 5.

As illustrated in FIG. 12C and in an assembled fluid dispensing system 1, the positioning of the actuation head 426 as well as the dolly surface 434 is similar to the positions of the corresponding parts shown for the embodiments of FIGS. 10C and 11C. The skilled person appreciates that the first part forming the actuation part 420 may be shaped to present the second surface in a more upwardly placed position. The position or shape of the fixed dolly 430 could then be adjusted accordingly.

The operation of the fluid dispensing system 1 including the adaptor assembly 400 as shown in FIG. 12C resembles in large the operation of the operation of the fluid dispensing system 1 shown in FIG. 11C and as illustrated in FIGS. 9A and 9B. Thus, the first part forming the actuation part 420 becomes part of the actuator 124 and is movable together with the actuator 124, wherein a user force (P) applied to the actuator 124 displaces actuation part 420 from a non-actuated position to the actuated position, thereby compressing the elongated and elastic tube at lower portion thereof, wherein the tube is compressed into a cavity formed by the dolly surface 434.

Figures 13A, 13B, 13C:
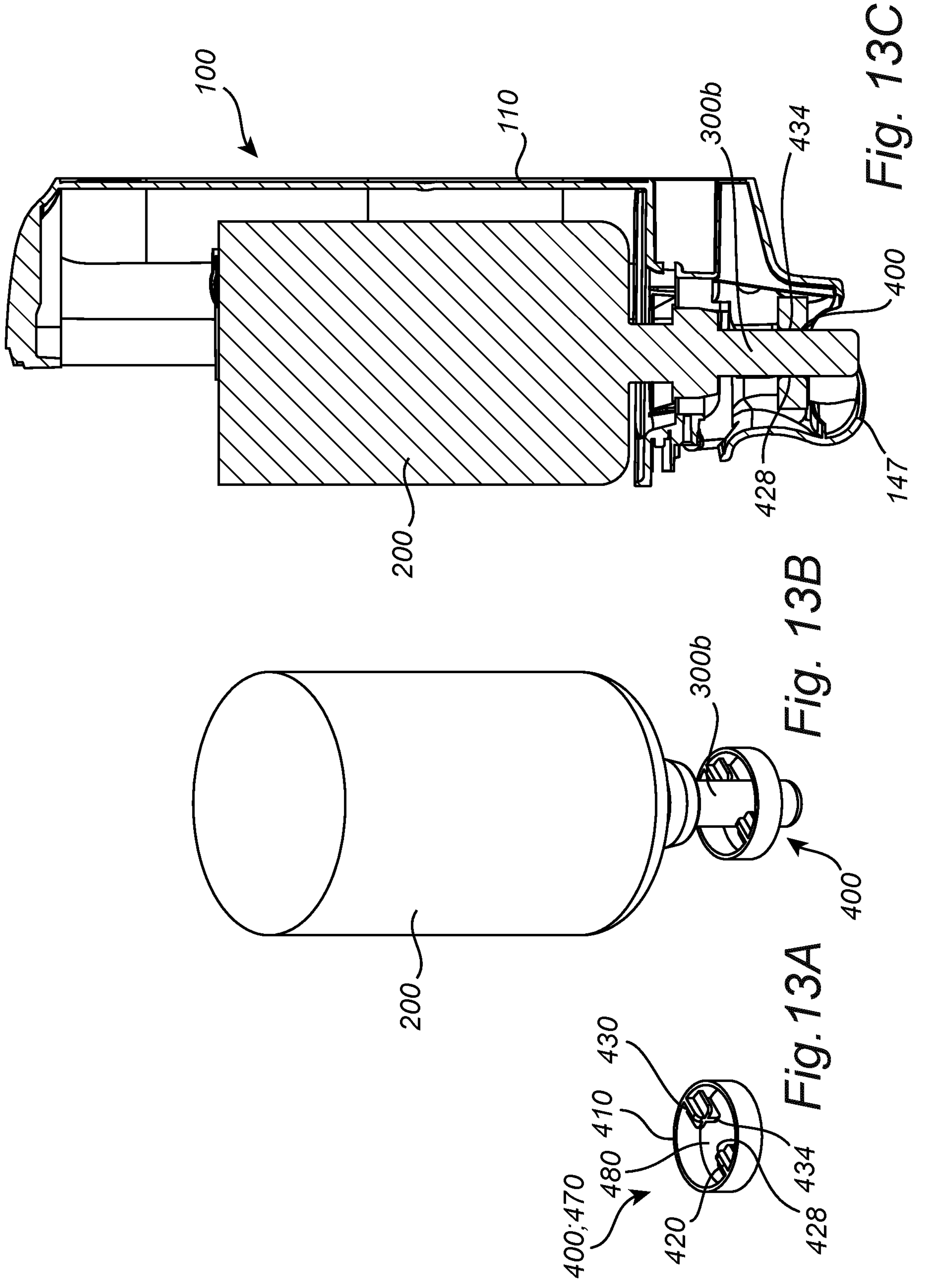
FIG. 13A is a perspective view of an embodiment of an adaptor assembly.
FIG. 13B shows a perspective view of the fluid container of FIG. 5 with the adaptor assembly of FIG. 13A attached thereto.
FIG. 13C shows a partial cross-sectional view of an embodiment of a fluid dispensing system comprising fluid container and the adaptor assembly shown in FIG. 13B.

FIG. 13A illustrates an embodiment of an adaptor assembly 400 comprising a first connecting support 410 being an elastic and flexible element with a recess 480 having a lateral dimension being larger than the pump has in a lateral direction. As shown in FIG. 13A, the elastic and flexible element has a circular shape with a central through opening 480 therein forming the recess. The actuation part 420 and the fixed dolly 430 are carried by the element and form portions protruding from opposite side within the recess such that the pump 300*b* of the second type is able to be configured between the second contact surface 428 of the actuation part 420 and the fixed dolly 430. As illustrated in FIG. 13B, the elongated and elastic pump chamber of fluid container 200 as shown in FIG. 5 can be inserted into the through opening 480 of the ring and be placed between the two protruding portions, wherein the elastic ring securely biases the opposite protruding portions to the pump in a non-compressing and non-distorting manner, i.e. in a non-actuated position. The skilled person understands that the dimensions, shapes and materials may be adjusted to provide proper biasing of the structure in the non-actuated position.

FIG. 13C shows a partial cross-sectional view of an embodiment of a fluid dispensing system 1 viewed from the side. The fluid dispensing system 1 comprises fluid container 200 as shown in FIG. 5 and the adaptor assembly 400 shown if FIG. 13B.

The flexible and elastic element forms both the first connecting support 410 for holding the fixed dolly 430 and the actuation part 420 in the form of the two portions protruding into the through opening 480 of the flexible and elastic element, here shown as an elastic ring. The elastic ring with the protruding portions may form a fluid container support 470 as well. It provides a connection to fluid container 200 and is configured to rest on front and rear portions 110;112 of the dispenser 100 at a lower portion 102 of the dispenser 100. In Thus, the diameter of the elastic ring has a dimension to just fit in the seat between the rear portion 110 and the actuator 124. Optionally, the adaptor assembly 400 may additionally, or as an alternative, comprise the fluid connection support of the embodiment shown in FIGS. 12A and 12B, or the like.

An assembly of a fluid dispensing system 1 shown in FIG. 13C including the dispenser 100 of FIG. 1, a disposable container of FIG. 5 and the adaptor assembly 400 of FIGS. 13A to 13B is simple and contains a few steps only. Following the opening of the front cover of the dispenser 100, the fluid container 200 is inserted into dispenser 100 from the top with the elongated and elastic pump chamber inserted through the holding opening 139 of the dispenser 100. The elastic and flexible element is then from the bottom of the dispenser 100 brought on to the elongated and elastic tube chamber 300*b* of the fluid container 200 inserted in the dispenser 100 so that the tube chamber 300*b* is placed in between the protruding portions of the elastic ring, of which one should be configured close to the rear position and the other one close to the front portion 112 and the actuator 124 thereof, see FIG. 13C. The height can be adjusted to provide a proper fluid connection support and dispensing.

The operation of the fluid dispensing system 1 including the adaptor assembly 400 as shown in FIG. 13C resembles in general the operation of the fluid dispensing system 1 illustrated in FIGS. 9A and 9B. When a user force (P) is applied to the user actuator 124, the elastic ring is compressed from a non-actuated position to an actuated position, i.e. it is compressed towards the dolly 430 and rear portion 110 of the dispenser 100 so that the elongated and elastic pump chamber is laterally compressed between said second surface and the fixed dolly 430 causing fluid to be dispensed from the fluid container 200. The skilled person understands that the dimensions, shapes and materials may be adjusted to provide proper biasing of the structure in the non-actuated position and to provide the possibility for a user to press the actuator 124 by the hand to actuate the dispensing of fluid and to return the elastic ring to the non-actuated position, when the user removes the hand from the actuator 124. The adaptor assembly 400 may be therefore be made of a plastic material such as olefin plastics, e.g. polyethylene or polypropylene.

As the skilled person will appreciate, it is intended that the detailed description be regarded as illustrative and that many embodiments and alternatives are possible within the scope of the present disclosure as defined by the appended claims. For example, the adaptor assembly may adopt other shapes than the ones shown in the drawings, e.g. the adaptor assembly may comprise a unit with the first connecting part and the actuation part as illustrated for the embodiments of FIGS. 6A-6C and FIGS. 10A-10B, and the fixed dolly may be arranged as illustrated for the embodiment of FIGS. 12A and 12B.

Attention is drawn to the fact that use of the adaptor assembly does not require the removal of the engagement means 134 of the actuator used for axial compression of the pump 300*a* of the first type, see Figures.

The invention claimed is:

1. An adaptor assembly for use in a dispenser for a replaceable fluid container, the adaptor assembly comprising:

an actuation part movable between a non-actuated position and a fully actuated position when mounted in the dispenser; and a first connecting support configured to removably connect the actuation part to the dispenser and/or a fluid dispensing package mounted in a compartment within the dispenser, wherein the actuation part comprises a first contact surface configured to abut against a user actuator of the dispenser and a second contact surface configured to abut against a pump of the fluid container that is a type actuated by lateral compression, wherein the actuation part is configured to receive a user force applied to the user actuator to move from the non-actuated position towards the fully actuated position, thereby transferring an actuation force from the actuation part via the second surface to the pump to laterally compress the pump to cause fluid to be dispensed from the fluid container, and, wherein the first connecting support comprises a ring shaped base configured to wrap entirely around a portion of the fluid container.

2. The adaptor assembly according to claim 1, further comprising:

a fixed dolly configured to abut against the pump, wherein the second contact surface of the actuation part and the fixed dolly are configured to receive the pump therebetween such that, when the user force is applied to the user actuator, the second surface and the fixed dolly laterally compresses the pump therebetween causing fluid to be dispensed from the fluid container.

3. The adaptor assembly according to claim 2, wherein the first connecting support is configured to removably connect the fixed dolly to the dispenser and/or the fluid dispensing package mounted in the compartment.

4. The adaptor assembly according to claim 1, wherein the actuation part is configured to laterally compress the pump having a resilient pumping chamber.

5. The adaptor assembly according to claim 4, wherein the resilient pumping chamber is an elongated and elastic tube chamber extending downwards at the lower portion of the fluid container in a direction from a bottom of a fluid reservoir to a nozzle of the elastic tube chamber.

6. The adaptor assembly according to claim 1, wherein the actuation part is configured to receive the user force from the user actuator that is a user lever configured to pivot about a first pivot and extends from the pivot towards a user operating portion of the user lever, and wherein the first contact surface of the actuation part is configured to abut a surface of the user actuator that faces the compartment.

7. The adaptor assembly according to claim 6, wherein the user lever extends downwards from the first pivot.

8. The adaptor assembly according to claim 1, wherein the actuation part comprises an elongated arm extending in a longitudinal direction thereof, wherein the elongated arm comprises a first end connected to the first connecting support, and a second end opposite the first end having an actuation head, wherein the actuation head is movable between the non-actuated position and the fully actuated position, and wherein the actuation head comprises the second contact surface configured to abut against the pump and the first contact surface configured to abut against the user actuator.

9. The adaptor assembly according to claim 8, wherein the actuation head projects outwardly from the second end of the elongated arm in at least one direction forming an angle to the longitudinal direction of the elongated arm.

10. The adaptor assembly according to claim 8, wherein the actuation part is pivotally attached to the first connecting support and configured to pivot about a second pivot axis, and wherein the first end of the elongated arm is pivotally connected to the first connecting support and configured to pivot about the second pivot axis for allowing movement of the actuation head between the non-actuated position and the fully actuated position.

11. The adaptor assembly according to claim 8, wherein the elongated arm is a flexible arm for allowing movement of the actuation head between the non-actuated position and the fully actuated position.

12. The adaptor assembly according to claim 1, wherein the actuation part is movably connected to the first connecting support.

13. The adaptor assembly according to claim 12, wherein the actuation part is pivotally attached to the first connecting support and configured to pivot about a second pivot.

14. The adaptor assembly according to claim 1, further comprising a fluid container support configured to be received in the compartment of the dispenser and configured to hold the fluid container in a desired position in the compartment of the dispenser.

15. The adaptor assembly according to claim 14, wherein the fluid container support forms the first connecting support.

16. The adaptor assembly according to claim 1, further comprising one or more positioning structures configured to engage corresponding one or more connectors in the dispenser and to prevent axial and/or rotational movement of the adaptor assembly in the dispenser.

17. An adaptor assembly for use in a dispenser for a replaceable fluid container, the adaptor assembly comprising:

an actuation part movable between a non-actuated position and a fully actuated position when mounted in the dispenser; and a first connecting support configured to removably connect the actuation part to the dispenser and/or a fluid dispensing package mounted in a compartment within the dispenser, wherein the actuation part comprises a first contact surface configured to abut against a user actuator of the dispenser and a second contact surface configured to abut against a pump of the fluid container that is a type actuated by lateral compression, wherein the actuation part is configured to receive a user force applied to the user actuator to move from the non-actuated position towards the fully actuated position, thereby transferring an actuation force from the actuation part via the second surface to the pump to laterally compress the pump to cause fluid to be dispensed from the fluid container, wherein the adaptor assembly further comprises one or more positioning structures configured to engage corresponding one or more connectors in the dispenser and to prevent axial and/or rotational movement of the adaptor assembly in the dispenser, and wherein the one or more positioning structures comprises one or more protruding pins configured to engage one or more recesses in the dispenser.

18. A fluid dispensing system for dispensing fluids from a replaceable fluid container, comprising a dispenser comprising:

a housing, a compartment defined within the housing, and a user actuator;

a fluid container disposed within the compartment and comprising a pump of a second type actuated by lateral compression; and an adaptor assembly comprising:

an actuation part mounted in the dispenser and movable between a non-actuated position and a fully actuated position when mounted in the dispenser, and a first connecting support removably connecting the actuation part to the dispenser and/or a fluid dispensing package mounted in the compartment, wherein the actuation part comprises a first contact surface configured to abut against the user actuator of the dispenser and a second contact surface configured to abut against the pump of the second type, wherein the actuation part is configured to receive a user force applied to the user actuator to move from the non-actuated position towards the fully actuated position, thereby transferring an actuation force from the actuation part via the second surface to the pump of the second type to laterally compress the pump of the second type to cause fluid to be dispensed from the fluid container, wherein the dispenser has a front portion, a rear portion, an upper end portion, and a lower end portion, wherein the lower end portion forms a dispensing end portion of the dispenser and includes the user actuator that is actuated to dispense a dose of fluid through a nozzle at the lower end portion, wherein the fluid container includes a fluid reservoir, wherein the fluid reservoir extends downwards from the upper portion to the pump of the second type, wherein the pump of the second type is located at the lower end portion with the nozzle, wherein the compartment is sized to receive another fluid container having a pump of a first type that is an axially compressible pump, wherein the user actuator has an engagement portion configured to actuate the pump of the first type by providing a vertical force to axially compress the pump of the first type in a vertical direction towards the upper portion, and wherein the adaptor assembly adapts the compartment to be sized to receive the fluid container having the pump of the second type within the dispenser.

19. The fluid dispensing system according to claim 18, wherein the pump of the second type has a resilient pumping chamber.

20. The fluid dispensing system according to claim 19, wherein the resilient pumping chamber is an elongated and elastic tube chamber extending downwards at the lower portion of the fluid container in a direction from the bottom of the fluid reservoir to a nozzle of the elastic tube chamber.

21. The fluid dispensing system according to claim 18, wherein the user actuator is a user lever configured to pivot about first pivot axis and extends from the pivot axis towards a user operating portion of the user lever, and the user actuator has a surface that faces the compartment and is configured to abut the first contact surface of the actuation part.

22. The fluid dispensing system according to claim 21, wherein the user lever extends downwards from the first pivot axis.

23. The fluid dispensing system according to claim 18, further comprising a seat on which a fluid container support of the adaptor assembly rests and holds the fluid container in a desired position in the compartment of the dispenser.

24. The fluid dispensing system according to claim 23, wherein the dispenser comprises an engaging structure configured to hold the fluid container support in place in the dispenser.

25. The fluid dispensing system according to claim 24, wherein the engaging structure comprises displaceable structure displaceable between a non-holding position to a holding position.

26. The fluid dispensing system according to claim 18, further comprising:

one or more positioning structures configured to engage corresponding one or more connectors in the dispenser and to prevent axial and/or rotational movement of the adaptor assembly in the dispenser, and one or more connectors configured to engage the one or more positioning structures of the adaptor assembly.

27. The fluid dispensing system according to claim 26, wherein the one or more connectors are one or more recesses for engaging one or more pins of the adaptor assembly.

* * * * *